(12) United States Patent
Siekmann

(10) Patent No.: US 11,968,916 B2
(45) Date of Patent: Apr. 30, 2024

(54) ARTIFICIAL TURF MAINTENANCE ROBOT

(71) Applicant: Melos GmbH, Melle (DE)

(72) Inventor: Jorg Siekmann, Guetersloh (DE)

(73) Assignee: Melos GmbH, Melle (DE)

( * ) Notice: Subject to any disclaimer, the term of this patent is extended or adjusted under 35 U.S.C. 154(b) by 551 days.

(21) Appl. No.: 16/757,065

(22) PCT Filed: Nov. 2, 2018

(86) PCT No.: PCT/EP2018/080042
§ 371 (c)(1),
(2) Date: Apr. 17, 2020

(87) PCT Pub. No.: WO2019/086621
PCT Pub. Date: May 9, 2019

(65) Prior Publication Data
US 2020/0337201 A1    Oct. 29, 2020

(30) Foreign Application Priority Data

Nov. 2, 2017 (EP) ..................................... 17199728

(51) Int. Cl.
*A01B 45/00* (2006.01)
*A01G 20/47* (2018.01)
*E01C 13/08* (2006.01)

(52) U.S. Cl.
CPC .............. *A01B 45/00* (2013.01); *A01G 20/47* (2018.02); *E01C 13/08* (2013.01)

(58) Field of Classification Search
CPC ......... A01B 45/00; A01G 20/40; E01C 13/08; E01C 19/004; G05D 1/011; G05D 1/0246;
(Continued)

(56) References Cited

U.S. PATENT DOCUMENTS 3,644,954 A     2/1972  LeGrand
7,363,704 B2 *  4/2008  Kobayashi ....... G06K 19/07718
                                                29/827
(Continued)

FOREIGN PATENT DOCUMENTS

DE    202007015031 U1   3/2009
DE    102011055764 A1   5/2013
(Continued)

OTHER PUBLICATIONS

English language text of DE 10 2011 055 764 A1 (11 pages).*
(Continued)

*Primary Examiner* — Gary S Hartmann
(74) *Attorney, Agent, or Firm* — Harness, Dickey & Pierce, P.L.C.

(57) ABSTRACT

A method of maintaining artificial turf using a turf maintenance robot. The artificial turf comprises an artificial turf carpet, wherein the artificial turf carpet comprises turf fibers which form an artificial turf surface. The artificial turf fibers have a grain. The artificial turf comprises artificial turf infill distributed between the artificial turf fibers. The turf maintenance robot is a self-driving robot, wherein the turf maintenance robot comprises a memory for storing turf grain data, descriptive the grain of the artificial turf fibers. The method comprises brushing the artificial turf surface by the turf maintenance robot. The turf maintenance robot performs the brushing dependent upon the turf grain data.

18 Claims, 16 Drawing Sheets

(58) Field of Classification Search
CPC .............. G05D 1/0259; G05D 1/1028; G05F 2201/0201
See application file for complete search history.

(56) References Cited

U.S. PATENT DOCUMENTS

| | | | | |
|---|---|---|---|---|
| 7,556,841 | B2* | 7/2009 | Kimball | B44C 1/18 427/292 |
| 8,388,764 | B2* | 3/2013 | Jonsson | A01G 20/00 134/131 |
| 10,066,345 | B2* | 9/2018 | Spittle | D06N 7/0071 |
| 10,212,895 | B2* | 2/2019 | Owegeser | A47L 11/4066 |
| 10,610,076 | B2* | 4/2020 | Chavana, Jr. | A47L 11/4088 |
| 10,697,132 | B2* | 6/2020 | Ziegan | A01G 9/28 |
| 11,064,647 | B2* | 7/2021 | Altomare | B25J 11/00 |
| 2013/0192633 | A1 | 8/2013 | Gil | |
| 2014/0096984 | A1 | 4/2014 | Thunstrom et al. | |
| 2022/0192109 | A1* | 6/2022 | Coleman | B08B 1/002 |

FOREIGN PATENT DOCUMENTS

| | | |
|---|---|---|
| EP | 3342324 A1 | 7/2018 |
| WO | WO-2014007627 A1 | 1/2014 |
| WO | WO-2016042383 A2 | 3/2016 |

OTHER PUBLICATIONS

International Search Report PCT/ISA/210 for International Application No. PCT/EP2018/080042 dated Jan. 11, 2019.
Written Opinion PCT/ISA/237 for International Application No. PCT/EP2018/080042 dated Feb. 5, 2019.
Dworak et, al., "Drones Offer Unique Perpsective to Turfgrass Managers", SportsTurf, 2014.
International Preliminary Report on Patentability and Written Opinion for PCT/EP2018/080042 dated May 14, 2020.

* cited by examiner

ARTIFICIAL TURF MAINTENANCE ROBOT

This application is a national phase under 35 U.S.C. § 371 of PCT International Application No. PCT/EP2018/080042, which has an International filing date of Nov. 2, 2018, which claims priority to European Patent Application No. 17199728.1, filed Nov. 2, 2017 the entire contents of each of which are hereby incorporated by reference.

FIELD OF THE INVENTION

The invention relates to artificial turf, in particular to the maintenance of artificial turf.

BACKGROUND AND RELATED ART

Artificial turf or artificial grass is surface that is made up of fibers which is used to replace grass. The structure of the artificial turf is designed such that the artificial turf has an appearance which resembles grass. Typically artificial turf is used as a surface for sports such as soccer, American football, rugby, tennis, golf, for playing fields, or exercise fields. Furthermore artificial turf is frequently used for landscaping applications.

Artificial turf may be manufactured using techniques for manufacturing carpets. For example artificial turf fibers which have the appearance of grass blades may be tufted or attached to a backing. Often times artificial turf infill is placed between the artificial turf fibers. Artificial turf infill is a granular material that covers the bottom portion of the artificial turf fibers. The use of artificial turf infill may have a number of advantages. For example, artificial turf infill may help the artificial turf fibers stand up straight. Artificial turf infill may also absorb impact from walking or running and provide an experience similar to being on real turf. The artificial turf infill may also help to keep the artificial turf carpet flat and in place by weighting it down.

International patent application WO 2016/042383 A2 discloses a cleaning device comprising a chassis that can be moved over a ground surface. The cleaning device comprising a space in which a roller-shaped brush provided with bristles is arranged in a rotatable manner about an axle in such a way that said ground can be brushed therewith. The space is connected with an outlet channel for the removal of material brushed away by the bristles. In the brush and coaxially with the axle an air channel is arranged. The air channel being provided with a series of openings which are directed towards the outlet channel and open between the bristles.

International patent application publication WO 2014/007627 A1 discloses a device for carrying out maintenance operations on an artificial lawn, in particular an artificial grass sports field, which device is movable across the artificial lawn. The invention also relates to a method for carrying out such maintenance operations, on an artificial lawn, in particular an artificial grass sports field, using a maintenance device. The object of the invention is to provide a device for that purpose, which device comprises maintenance means for carrying out maintenance operations on the artificial lawn and drive means for moving the device autonomously across the artificial lawn. The device further comprises control means for controlling the maintenance means and the drive means on the basis of a maintenance plan.

German patent application publication DE 10 2011 055 764 A1 discloses a method for processing a textile floor surface, in particular a deep-pile carpet or carpet, with a self-propelled and self-steering floor cleaning device comprising a drive unit, a control unit for controlling the movement of the floor cleaning device and a floor cleaning unit with at least one electric motor-driven cleaning brush. In order to provide such a method with which a thorough as possible cleaning of textile floor surface can be carried out, at least one sensor of a sensor unit of the floor cleaning appliance detects a pile direction and transmits it to the floor cleaning appliance, the the pile direction is determined based on the sensor signal and the ground surface is processed in dependence on the determined direction of the pile.

SUMMARY

The invention provides for a method of maintaining artificial turf and a turf maintenance robot in the independent claims. Embodiments are given in the dependent claims.

The invention may provide for an improved means of maintaining an artificial turf by providing for a turf maintenance robot that performs brushing of the artificial turf surface dependent upon the turf grain data.

In one aspect the invention provides for a method of maintaining artificial turf using a turf maintenance robot. The artificial turf comprises an artificial turf carpet. The artificial turf carpet comprises turf fibers which form an artificial turf surface. The artificial turf surface fibers have a grain. The grain of an artificial turf as used herein encompasses the natural tendency of turf fibers to lie at a slightly slanted angle. The term grain is also alternatively known as the pile direction. In German the grain is known as Florrichtung.

The artificial turf comprises an artificial turf infill distributed between the artificial turf fibers. The turf maintenance robot is a self-driving robot. The turf maintenance robot comprises a memory for storing turf grain data descriptive of the grain of the artificial turf fibers. The grain of the artificial turf may for instance be depending upon different locations. The turf grain data may therefore be descriptive of the spatially dependent grain of the artificial turf fibers.

The method comprises brushing the artificial turf surface by the turf maintenance robot. The turf maintenance robot performs the brushing dependent upon the turf grain data. Performing brushing dependent upon the turf grain data could for example encompass determining the direction to perform the brushing as a function of location of the turf maintenance robot. The turf grain data may therefore be used to control the direction of the brushing and/or the control of the motion of the turf maintenance robot. This embodiment may be beneficial because it may be beneficial to brush the artificial turf surface properly such that the direction of the grain is taken into account.

For example it may be beneficial such that the brushing takes place against the direction of the grain. This may have the benefit of making the artificial turf stand up better and appear more like a natural turf.

In another embodiment the turf maintenance robot comprises a positioning system. The positioning system could be based on different systems. For instance it may be done using a triangulation based on cell tower data. Another method may be the use of a GPS receiver, a Galileo receiver or a Glonass receiver. The position determining system may also rely on the reception of radio signals from beacons or markers placed in or around the artificial turf surface. In some examples any or all of these position determining systems are used in one or more combinations.

As an alternative to GPS, the positioning system could be an Ultra-wideband (UWB) positioning system. A UWB positioning system uses UWB radio signals and uses a time of flight difference calculation to determine position. UWB is currently defined as an RF signal occupying a portion of the radio frequency spectrum that is greater than 20% of the carrier frequency or has a bandwidth of greater than 500 MHz. UWB uses low energy and typically does not interfere with other radio communications.

UWB positioning technology functions similar to GPS technology, but the UWB technology is often more accurate. A time delay between UWB radio signals between the positioning system of the turf maintenance robot and several radio transmitters is measured to determine location of the turf maintenance robot. The time delay of the signals between the turf maintenance robot and one of the transmitters can be used to determine the distance between the turf maintenance robot and that particular transmitter. The accuracy of UWB positioning can be up to 10 cm. Using intelligent filter algorithms and fusion with other sensors the accuracy of the positioning can be increased further.

For example, gyroscope data can be combined with UWB positioning to improve the accuracy of the positioning system. Gyroscopes are used in the Aerospace and automotive industries to improve positioning. The turf maintenance robot may also have a distance traveled measuring device that accurately measures the distance that the turf maintenance robot travels. This may for example be performed by using a sensor that measures or encodes the rotation of the wheels.

The turf maintenance robot may, for example, follow a predetermined cleaning program with a programmed driving path. The Navigation of this path may be performed using the UWB positioning technology, the distance traveled by the robot, and gyroscope data. The steering and drive of the turf maintenance robot may be performed by a programmed computer or controller that communicates with the drive system of the wheels, the steering and receives data from the sensor measuring wheel rotation, the UWB positioning system, and the gyroscope. A CAN-bus, as is used in automotive applications, may for example be used for the reviewing of sensor data and for controlling the turf maintenance robot.

In another embodiment, the positioning system is configured for determining a trajectory of the turf maintenance robot.

In another embodiment, the turf grain data is spatially dependent.

In another embodiment, the position system is further configured for providing a current location.

In another embodiment, the brushing of the artificial turf surface is at least partially determined by turf grain data and the current location. For example, the current location may be used to determining the turf grain data at the turf maintenance robot's current location or along a trajectory that the turf maintenance robot is following. This may be beneficial because knowing the location of the turf maintenance robot and also knowing the spatially dependent direction of the grain may help the robot brush the artificial turf surface more effectively. A knowledge of the turf grain data along a trajectory may also be used to adjust the trajectory of the turf maintenance robot to optimize or improve the brushing.

In another embodiment the turf maintenance robot further comprises a transceiver. The method further comprises receiving at least a portion of the turf grain data via the receiver. The method further comprises storing the turf grain data in the memory. This for example may be beneficial because different turf maintenance robots may be used in different locations. As a turf maintenance robot is moved to a different location it may retrieve the data for a particular artificial turf surface such as a particular sport or soccer field. This may enable more flexibility in maintaining artificial turf surfaces.

In another embodiment the method further comprises sending a database query via the transceiver. The turf grain data is received via the transceiver in response to the database query. This may be beneficial as it may provide for a means of managing data for a large number of different artificial turf surfaces. The use of a database query may also be used to format the particular type of data. For example the turf grain data may initially be stored in the form of a mapping at the location of a central database. In the course of the database query information about the type of robot and/or brushing surface may be included so that the appropriate turf grain data for that particular robot is returned in response to the database query.

In another embodiment, the turf maintenance robot comprises a receiver that is configured for at least partially determining the current location using multiple received radio signals. For example an artificial turf surface or playing field could have several antennas or transmitters which emit an electromagnetic field or a signal. The electromagnetic field or signal could for example be an analog or digital signal. The reception of these multiple radio signals could be used to determine the location of the turf maintenance robot on the artificial turf surface. For example one antenna could be placed at each corner of artificial turf surface or playing field. In some examples the receiver is part of the transceiver mentioned above. In other examples the receiver is a separate component.

In another embodiment the turf maintenance robot comprises at least one optical sensor configured for acquiring optical data descriptive of the artificial turf surface within a field of view of the at least one optical sensor. The method further comprises acquiring the optical data using the at least one optical sensor. The method further comprises using the controller to at least partially determine the turf grain data using the optical data. This embodiment may be beneficial because the turf grain data may be updated or modified using the optical sensor before the turf maintenance robot actually traverses a particular region of an artificial turf surface. This may lead to more effective and/or more efficient maintaining of the artificial turf.

In another embodiment the at least one optical sensor comprises any one of the following: a camera, a stereo camera, and combinations thereof.

In another embodiment the controller is configured to use a machine learning algorithm to at least partially determine the turf grain data using the optical data. The machine learning algorithm may for instance contain a programmed neural network or other artificial intelligence algorithm such as a pattern recognition algorithm which is used to determine the turf grain data from the optical data.

In another embodiment the turf maintenance robot comprises a usage meter for recording usage data. The usage data comprises any one of the following: a time usage data, a distance travelled usage data, and combinations thereof. The method further comprises recording the usage data using the usage meter. The usage data may be beneficial in several different situations. It may be useful for generating billing but this is not the only use. For example the usage data may be effective in estimating when the turf maintenance robot needs maintenance or repairs. The usage data may reflect the actual amount of time which the turf maintenance robot is in use. This may be useful in either scheduling periodic maintenance to avoid failure of the turf maintenance robot or in the diagnosis of failures after they have already occurred.

In another embodiment the method further comprises generating an invoice using the usage data.

In another embodiment the method further comprises sending the usage data to a remote server or a cloud storage device. The method further comprises generating a billing invoice using the usage data by the remote server of the cloud storage device. This may provide for an efficient means of billing during the use of the turf maintenance robot.

The remote server could for example be, but is not limited to: a smart phone, a computer, a database system, or a cloud storage device.

In another embodiment the method further comprises generating repair instructions using at least partially the usage data. This embodiment may be beneficial because the actual use of the turf maintenance robot may provide communications of which parts are likely to fail. This may provide for more rapid or efficient repair of the turf maintenance robot.

In another embodiment the turf maintenance robot further comprises at least two drive wheels configured for propelling the self-propelled robot. The at least two drive wheels have a common rotational axis. A brush is mounted at least partially behind the rotational axis. The brush is mounted between the two drive wheels. Mounting the brush behind the rotational axis may be beneficial because if there are any objects or protrusions in the artificial turf surface the effect will be to lift the robot over its center of gravity and not to cause a tipping motion in the turf maintenance robot.

The use of the word behind, as used herein, can be understood to be defined by the direction of travel of the self-propelled robot. For example if the self-propelled robot is traveling in a particular direction the portion of the self-propelled robot that is opposed to the direction of travel would be the region behind the self-propelled robot.

In another embodiment, the brush is a stationary brush. A stationary brush as used herein is a brush that has a stationary or fixed position relative to the turf maintenance robot. The stationary brush may be attached to a mechanism to adjust the height of the brush relative to the drive wheels but the stationary brush is non-rotational.

The stationary brush may be alternatively defined such that the stationary brush performs brushing of the artificial turf carpet by being dragged across the artificial turf surface. The dragging is due to motion caused by the at least two drive wheels.

The advantage of using a stationary brush is that it eliminates the need to use a costly system to rotate a cylindrical brush. The brush is simpler and the brush does not need a separate drive system to rotate the brush.

In another embodiment the turf maintenance robot comprises a vacuum system configured for vacuuming the artificial turf surface. The method further comprises vacuuming the artificial turf surface during the brushing of the artificial turf surface.

In another embodiment the vacuum system comprises an inlet nozzle that is configured for contacting the artificial turf surface in front of the brush. Placing the inlet nozzle before the brush may aid in removing debris from the artificial turf before it can be mixed into the artificial turf infill by the brush.

In another embodiment the turf maintenance robot further comprises turf infill ploughing structures in front of the brush. The use of the turf infill ploughing structures may be beneficial as they may help place the artificial turf fibers in an upright position and also to make it easier for the brush to level the infill material. The turf infill ploughing structures may also be referred to as a rake.

As used herein front indicates the portion of the turf maintenance robot which is closest to the direction of travel.

In another embodiment the turf infill ploughing structures may be located between the inlet nozzle and the brush. This may be beneficial because any trash or debris may be removed by the vacuum system before the turf infill ploughing structures begin to move or displace the artificial turf infill. This may help reduce the chances that debris or garbage is mixed into the artificial turf infill.

In another embodiment the turf infill ploughing structures comprise a ploughing structure height adjustment mechanism. This may be beneficial because it may be useful in modifying how the turf maintenance robot performs on different artificial turf surfaces. For example the ploughing structure height adjustment mechanism could either be manually or automatically adjusted.

In another embodiment the turf maintenance robot comprises a brush height adjustment mechanism for adjusting the brush height. Again, this brush height adjustment mechanism could be either manually or automatically adjusted. The use of the brush height adjustment mechanism may be beneficial if the turf maintenance robot is used on different artificial turf surfaces. It could be used to adjust for different types or amounts of infill as well as different types of artificial turf fiber.

In another embodiment the brushing of the artificial turf surface comprises calculating a cross brushing path using at least partially the turf grain data and also controlling the turf maintenance robot to follow the cross brushing path. Cross brushing as used herein is defined as brushing in a direction that directly opposes the grain of the artificial turf surface.

In another embodiment the method further comprises controlling the turf maintenance robot to travel between multiple artificial turf surfaces. This may be beneficial because a single turf maintenance robot may be used to maintain more than one artificial turf.

In another embodiment the turf maintenance robot further comprises at least one RFID reader. The method further comprises at least partially determining the turf grain data using the at least one RFID reader. For example the location of the turf maintenance robot could be determined by data received by the at least one RFID reader. For example RFID tags could be embedded in the artificial turf carpet, for example in the backing. This could be accomplished in different ways. The RFID tags may for instance have unique numbers which are known to be related to particular locations. The RFID tags could also locally contain data which is descriptive of the location or even of the turf grain data.

In another embodiment the artificial turf comprises an artificial turf carpet with a backing. The backing comprises RFID carriers. The RFID carriers contain local turf data. The local turf data at least partially comprises the turf grain data. The controller is configured for at least partially receiving the turf grain data from the RFID data carriers by reading the local turf data from the RFID carriers with the at least one RFID reader.

The RFID data carriers for instance may also be used to mark a particular path or boundary of the artificial turf.

In another embodiment the artificial turf fibers comprise an optical path marked with fluorescent dye markers. The self-propelled robot comprises at least one optical sensor configured for acquiring optical data descriptive of the artificial turf surface within a field of view of the at least one optical sensor. The controller is configured for detecting the optical path marked with fluorescent dye markers within the optical data. The method further comprises at least partially determining the turf grain data using the optical path. The optical path may take different forms in different examples. In one example the optical path may be used to denote boundaries of the artificial turf or boundaries where the artificial turf has different grains. The optical path may also be an indication of a particular path that the turf maintenance robot should follow. The fluorescent dye markers could for instance be combined into particular artificial turf fibers.

In another embodiment the artificial turf fibers comprise a magnetic path marked with magnetic markers. The self-propelled robot comprises a magnetic sensor configured for determining the magnetic path marked with the magnetic markers. The method further comprises at least partially determining the turf grain data using the magnetic path. The magnetic path may for instance be a particular path for the robot to follow or may be used to mark the boundaries between different regions with different grains.

In another embodiment the method further comprises automatically moving the turf maintenance robot between the different artificial turf surfaces using an autonomous vehicle. For example the autonomous vehicle may be a so-called self-driving car and may be used to take the turf maintenance robot between remote locations. This may have the benefit of reducing the cost by being able to use the turf maintenance robot automatically at different locations.

In another embodiment the autonomous vehicle comprises a robot cradle for holding the turf maintenance robot during travel. The robot cradle is further configured for charging the turf maintenance robot. This may be beneficial because as the turf maintenance robot is being moved it is also being charged. The time which is used for charging can now be used to transport to a new location so that the turf maintenance robot is used more effectively.

In another embodiment, the method further comprises controlling a drone to fly over the artificial turf and acquire the artificial turf data. The artificial turf data is descriptive of the artificial turf. The drone comprises a sensor configured for acquiring artificial turf data descriptive of the artificial turf.

The method further comprises controlling the turf maintenance robot to perform maintenance on the artificial turf using the artificial turf data. This embodiment may be beneficial because it may provide for a more efficient means of maintaining the artificial turf. The drone is able to determine where the maintenance is needed. This for example may be useful in reducing the amount of time that an artificial turf is unavailable due to maintenance with the turf maintenance robot.

The artificial turf maintenance robot may perform maintenance in several different manners. For example artificial turf has a grain. The turf maintenance robot may perform cross brushing on the artificial turf to raise the pile of the artificial turf into a more natural position. There may also be debris or other materials which are on the surface of the artificial turf. The turf maintenance robot may be used for cleaning the surface of the artificial turf. For example the drone may fly over and locate the position of trash or other debris on the artificial turf. Artificial turf also often contains so called artificial turf infill which is granular material which is dispersed within the pile of the artificial turf carpet. The turf maintenance robot may in some instance be configured for re-distributing the artificial turf infill or possibly for even adding additional artificial turf infill.

The control of the artificial turf maintenance robot to perform the maintenance on the artificial turf using the artificial turf data may be performed in several different ways. In one example the drone overflies the artificial turf first and acquires the necessary data and provides this to the turf maintenance robot. In another example the drone may hover or fly as the turf maintenance robot is performing the maintenance. This may have several advantages. The turf maintenance robot may obtain its coordinates and guidance from the drone. The drone could then optically control the turf maintenance robot or know its location so that an external location system or GPS is not necessary. This for example may be beneficial in indoor arenas where a GPS signal is not available. The use of the drone for guiding the turf maintenance robot may therefore be beneficial because it also provides a guidance system for the turf maintenance robot.

In another embodiment the artificial turf data comprises image data. The method further comprises identifying at least one maintenance zone within the artificial turf by inputting the image data into an image classification module. The method further comprises controlling the turf maintenance robot to perform the maintenance on the at least one maintenance zone. In this embodiment the image data is input into the image classification module and this is used to identify regions that need maintenance. This may accelerate the maintenance of the artificial turf by the turf maintenance robot. For example the image classification module may identify debris or trash that is on the surface of the artificial turf. Additionally it may indicate when the pile or grain of the artificial turf has been trampled down and requires cross brushing. In other examples it may also be able to optically identify when there is too little or displaced artificial turf infill and it may control the turf maintenance robot to redistribute the infill or provide more infill.

In another embodiment, the method further comprises limiting maintenance to the at least one maintenance zone. In this embodiment the turf maintenance robot does not maintain areas that are not identified as maintenance zones. This may result in greatly accelerating the maintenance of the artificial turf by the turf maintenance robot.

In another embodiment the sensor comprises any one of the following: a camera, a stereo camera and combinations thereof. This may be beneficial because it may be easy to mount cameras on a drone and use this to detect the maintenance zones.

In another embodiment the image classification module is configured for identifying the at least one maintenance zone by detecting a color different in the turf images. For example, there may be a color difference between the artificial turf fibers and the artificial turf infill. This may be useful in identifying if there is too much or too little artificial turf infill at a particular location. The color of the artificial turf may also change if the pile has been trampled in one direction.

In another embodiment the image classification module is configured for identifying the at least one maintenance zone by detecting a spatially dependent reflectivity of the artificial turf. A laser or other light source may be bounced off the surface and its reflectivity measured. The reflectivity of the artificial turf may for example indicate a lack or surplus of artificial turf infill as well as an indication of the state of the grain. For example if the pile has been pushed over too much it may affect the reflectivity.

In another embodiment the image classification module is configured for identifying the at least one maintenance zone by detecting a pile direction pattern in the turf images. For example the individual blades or grains of the artificial turf may be detected directly by imaging this.

In another embodiment the image classification module is at least partially implanted as a neural network. This embodiment may be beneficial because the neural network may be useful in identifying or classifying various regions of the artificial turf as being in need of maintenance or not. For example the neural network could be easily programmed to identify trash or objects sitting on the artificial turf. The neural network could also be useful for identifying the absence or lack of artificial turf infill or the grain in varying light conditions. The neural network may provide for a more robust and better functioning image classification module.

In another embodiment the performing maintenance of the artificial turf comprises any one of the following: cleaning a surface of the artificial turf, cross-brushing the artificial turf, re-distributing the artificial turf infill, and combinations thereof.

In another embodiment, the artificial turf data comprises the turf grain data.

In another aspect, the invention provides for a turf maintenance robot configured for brushing an artificial turf surface. The turf maintenance robot is a self driving robot. The turf maintenance robot comprises a processor for controlling the turf maintenance robot. The turf maintenance robot further comprises a memory for storing turf grain data descriptive the grain of the artificial turf fibers. The memory further contains machine executable instructions for execution by the processor. Execution of the machine executable instructions causes the processor to control the turf maintenance robot to brush the artificial turf fibers dependent upon the turf grain data.

In another aspect, the invention provides for a turf maintenance robot configured for brushing an artificial turf surface. The turf maintenance robot is a self driving robot. The turf maintenance robot comprises two drive wheels configured for propelling the self propelled robot. The at least two drive wheels have a common rotational axis. The turf maintenance robot further comprises a stationary brush mounted at least partially behind the rotational axis. The stationary brush is mounted between the two drive wheels. The embodiment may be advantageous because the use of the stationary brush simplifies the construction of the turf maintenance robot in comparison to a rotational brush.

In another embodiment, the turf maintenance robot further comprises a grass cutting element. The turf maintenance robot may have a grass cutting element such as a rotating blade or other cutting element that is configured such that it is able to cut grass to a predetermined height or an adjustable height. Such an embodiment would be beneficial if the turf is a so called hybrid turf that incorporates elements of both a natural turf and an artificial turf. In some examples the grass cutting element can be selectively turned off or deactivated. For example, the turf maintenance robot could be used to maintain an artificial turf surface with the grass cutting element deactivated. When the turf maintenance robot is over a natural or hybrid turf surface the grass cutting element could be turned on or activated.

In another embodiment, the turf maintenance robot further comprises a grass watering component. The turf maintenance robot could incorporate a reservoir for holding water or be connected to a hose that supplies water to the watering component. The watering component could for example be a spray nozzle that is able to water a natural or hybrid turf surface. Like the grass cutting element the watering component could be configured to selectively turned on or off.

In another embodiment, the turf maintenance robot further comprises a magnetic metal removal component. The turf maintenance robot could incorporate a permanent or electro magnet that is suspended over the artificial turf surface. As the turf maintenance robot moves over the turf surface the magnetic metal removal component could attract ferromagnetic materials that may be contaminating the turf.

In another embodiment, the turf maintenance robot comprises a positioning system for providing a current location to the processor. The processor is configured for self driving the turf maintenance robot at least partially using the current location. The processor may for example be programmed to calculate a trajectory or path for the turf maintenance robot to follow. The current location may provide a means for the turf maintenance robot to follow this path or trajectory.

In another aspect, the invention provides for a turf maintenance robot configured for brushing an artificial turf surface. The turf maintenance robot is a self driving robot, The turf maintenance robot comprises a wireless network interface configured for connecting to a cloud server. The wireless network interface could for example be, but is not limited to: a cellular IP connection, a WIFI connection, a radio connection, or a Bluetooth connection.

The turf maintenance robot further comprises a processor for controlling the turf maintenance robot. The turf maintenance robot further comprises a memory containing machine executable instructions for execution by the processor. Execution of the machine executable instructions causes the processor to connect to the cloud server. Execution of the machine executable instructions further causes the processor to receive turf maintenance data from the cloud server. Execution of the machine executable instructions further causes the processor to control the turf maintenance robot to brush the artificial turf fibers at least partially using the turf maintenance data.

The turf maintenance data may take different forms in different examples. In some examples the turf maintenance data comprises turf grain data. In other examples the turf maintenance data comprises instructions for controlling the operation of the turf maintenance robot.

In some examples the cloud server is a remote server. In other examples the cloud server is a smart phone.

In one aspect the invention provides for a turf maintenance system that comprises a turf maintenance robot according to an embodiment. The turf maintenance system further comprises a drone configured for flying above the artificial turf. The drone comprises a sensor configured for acquiring artificial turf data descriptive of the artificial turf. The turf maintenance system further comprises a memory for storing machine-executable instructions. The turf maintenance system further comprises a processor configured for controlling the turf maintenance system. Execution of the machine-executable instructions causes the processor to control the drone to fly over the artificial turf and acquire the artificial turf data. Execution of the machine-executable instructions further causes the processor to control the turf maintenance robot to perform maintenance on the artificial turf using the artificial turf data. This embodiment may be beneficial because it may provide for a more efficient means of maintaining the artificial turf. The drone is able to determine where the maintenance is needed. This for example may be useful in reducing the amount of time that an artificial turf is unavailable due to maintenance with the turf maintenance robot.

The artificial turf maintenance robot may perform maintenance in several different manners. For example artificial turf has a grain. The turf maintenance robot may perform cross brushing on the artificial turf to raise the pile of the artificial turf into a more natural position. There may also be debris or other materials which are on the surface of the artificial turf. The turf maintenance robot may be used for cleaning the surface of the artificial turf. For example the drone may fly over and locate the position of trash or other debris on the artificial turf. Artificial turf also often contains so called artificial turf infill which is granular material which is dispersed within the pile of the artificial turf carpet. The turf maintenance robot may in some instance be configured for re-distributing the artificial turf infill or possibly for even adding additional artificial turf infill.

The control of the artificial turf maintenance robot to perform the maintenance on the artificial turf using the artificial turf data may be performed in several different ways. In one example the drone overflies the artificial turf first and acquires the necessary data and provides this to the turf maintenance robot. In another example the drone may hover or fly as the turf maintenance robot is performing the maintenance. This may have several advantages. The turf maintenance robot may obtain its coordinates and guidance from the drone. The drone could then optically control the turf maintenance robot or know its location so that an external location system or GPS is not necessary. This for example may be beneficial in indoor arenas where a GPS signal is not available. The use of the drone for guiding the turf maintenance robot may therefore be beneficial because it also provides a guidance system for the turf maintenance robot.

In another embodiment the artificial turf data comprises image data. Execution of the machine-executable instructions further causes the processor to identify at least one maintenance zone within the artificial turf by inputting the image data into an image classification module. Execution of the machine-executable instructions further causes the processor to control the turf maintenance robot to perform the maintenance on the at least one maintenance zone. In this embodiment the image data is input into the image classification module and this is used to identify regions that need maintenance. This may accelerate the maintenance of the artificial turf by the turf maintenance robot. For example the image classification module may identify debris or trash that is on the surface of the artificial turf. Additionally it may indicate when the pile or grain of the artificial turf has been trampled down and requires cross brushing. In other examples it may also be able to optically identify when there is too little or displaced artificial turf infill and it may control the turf maintenance robot to redistribute the infill or provide more infill.

In another embodiment execution of the machine-executable instructions further causes the processor to limit maintenance to the at least one maintenance zone. In this embodiment the turf maintenance robot does not maintain areas that are not identified as maintenance zones. This may result in greatly accelerating the maintenance of the artificial turf by the turf maintenance robot.

In another embodiment the sensor comprises any one of the following: a camera, a stereo camera and combinations thereof. This may be beneficial because it may be easy to mount cameras on a drone and use this to detect the maintenance zones.

In another embodiment the image classification module is configured for identifying the at least one maintenance zone by detecting a color different in the turf images. For example, there may be a color difference between the artificial turf fibers and the artificial turf infill. This may be useful in identifying if there is too much or too little artificial turf infill at a particular location. The color of the artificial turf may also change if the pile has been trampled in one direction.

In another embodiment the image classification module is configured for identifying the at least one maintenance zone by detecting a spatially dependent reflectivity of the artificial turf. A laser or other light source may be bounced off the surface and its reflectivity measured. The reflectivity of the artificial turf may for example indicate a lack or surplus of artificial turf infill as well as an indication of the state of the grain. For example if the pile has been pushed over too much it may affect the reflectivity.

In another embodiment the image classification module is configured for identifying the at least one maintenance zone by detecting a pile direction pattern in the turf images. For example the individual blades or grains of the artificial turf may be detected directly by imaging this.

In another embodiment the image classification module is at least partially implanted as a neural network. This embodiment may be beneficial because the neural network may be useful in identifying or classifying various regions of the artificial turf as being in need of maintenance or not. For example the neural network could be easily programmed to identify trash or objects sitting on the artificial turf. The neural network could also be useful for identifying the absence or lack of artificial turf infill or the grain in varying light conditions. The neural network may provide for a more robust and better functioning image classification module.

In another embodiment the performing maintenance of the artificial turf comprises any one of the following: cleaning a surface of the artificial turf, cross-brushing the artificial turf, re-distributing the artificial turf infill, and combinations thereof.

It is understood that one or more of the aforementioned embodiments of the invention may be combined as long as the combined embodiments are not mutually exclusive.

BRIEF DESCRIPTION OF THE DRAWINGS

In the following embodiments of the invention are explained in greater detail, by way of example only, making reference to the drawings in which.

DETAILED DESCRIPTION

Like numbered elements in these figures are either equivalent elements or perform the same function. Elements which have been discussed previously will not necessarily be discussed in later figures if the function is equivalent.

Figure 1:
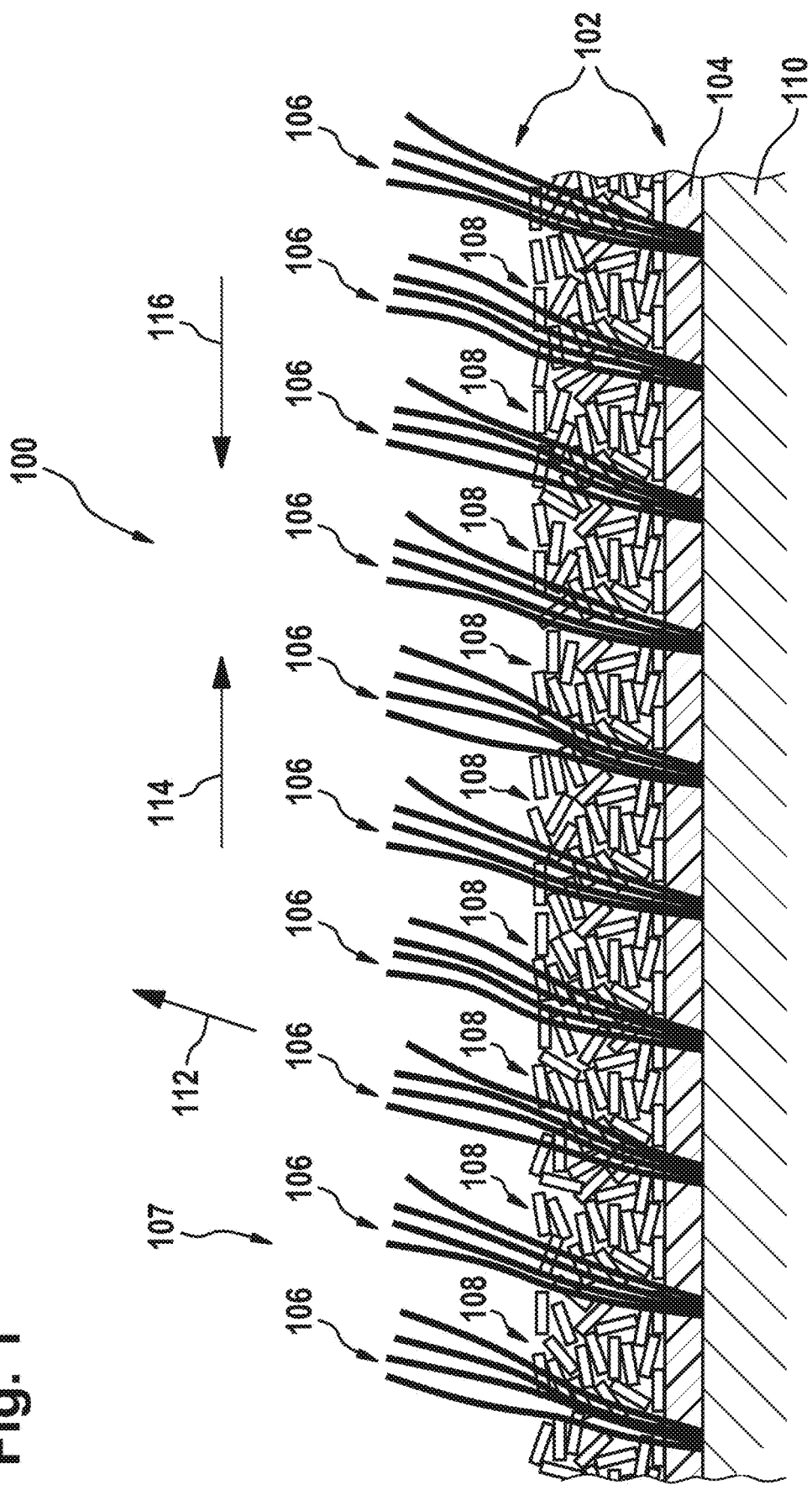
FIG. 1 illustrates an example of an artificial turf.

FIG. 1 shows a cross-sectional view which illustrates an example of an artificial turf 100. The artificial turf 100 comprises an artificial turf carpet 102. The artificial turf carpet 102 comprises a backing 104 into which artificial turf fibers 106 are tufted or attached. Between the artificial turf fibers 106 is distributed artificial turf infill 108. The artificial turf infill 108 makes the artificial turf 100 seem more soft and shock-absorbent and also serves to help support the artificial turf fibers 106 in a vertical direction. The artificial turf carpet 102 can be seen as being placed on the ground 110. The artificial turf fibers 106 form an artificial turf surface 107. The artificial turf surface 107 is the portion of the artificial turf which is exposed and which a user of the artificial turf 100 would walk or run on.

When an artificial turf carpet 102 is manufactured the artificial turf fibers 106 are tufted and they may preferentially be tilted at a particular angle. The vector 112 is aligned with the average direction of the artificial turf fibers 106. It can be seen that this is not directly in a vertical position. This is very typical for many artificial turf carpets 102 that are manufactured. The orientation of the vector 112 is the origin of the grain. When the vector 112 is projected into the plane of the backing 104 it results in a vector that travels in a horizontal direction. For the vector 112 the vector 114 indicates the rough direction of the grain. When viewed from above the artificial turf fibers 106 look like they are lying in the direction 114. Direction 116 is the cross-brushing direction 116. Vector 116 is directly opposed to the vector 114 or the grain direction. Brushing the artificial turf fibers 106 in the cross-brushing direction 116 helps the artificial turf fibers 106 to become more vertical and assume a more realistic behavior when compared to real grass.

Figure 2:
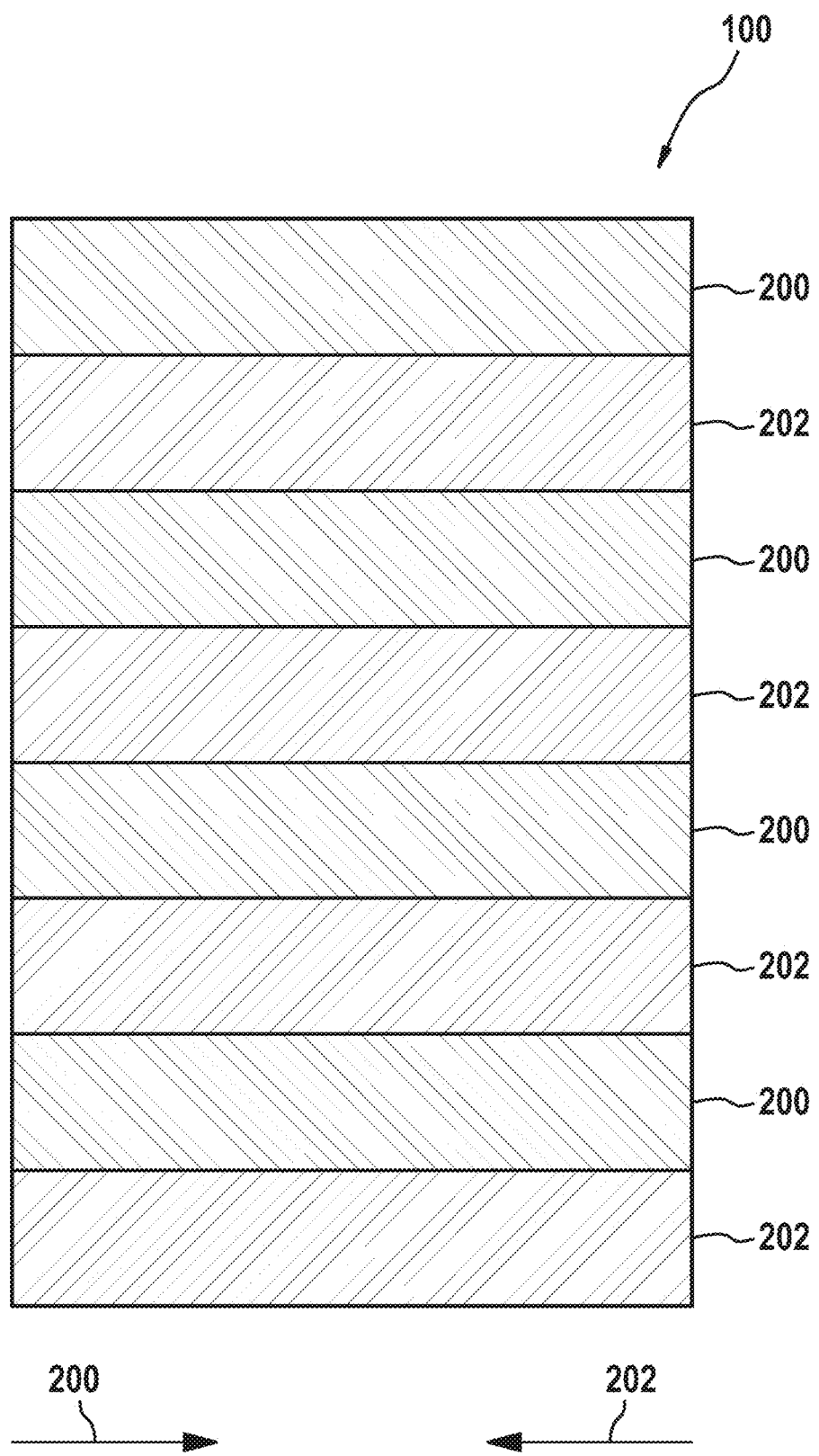
FIG. 2 shows a further example of an artificial turf.

FIG. 2 shows an example of an artificial turf 100. The artificial turf 100 may for example be a soccer field or other playing surface. When natural turfs are cut with a lawn mower they are typically done in paths using the lawn mower. This may lead to a lawn that has different regions of uniform appearance. To copy this often times when artificial turfs are installed the artificial turf carpet is installed in sections with the grain of the artificial turf carpet arranged in different directions. FIG. 2 illustrates an artificial turf 100 that has been installed in such a way. There are regions 200 which have the grain going in the direction indicated by the arrow 200 and regions 202 which have the grain going in the opposing direction indicated by the arrow 202.

To effectively maintain or clean the artificial turf 100 the turf maintenance robot preferably knows which direction to brush the artificial turf in which region. In the regions labeled 200 the artificial turf would be preferentially brushed in the direction opposite of the arrow 200. In the regions 202 the artificial turf would be preferentially brushed opposite to the direction of the arrow 202. Over extended use the grain of the artificial turf may also change. It may therefore be beneficial as time occurs to update or modify turf grain data to better reflect the actual spatial dependence of the grain within the artificial turf 100.

Figure 3:
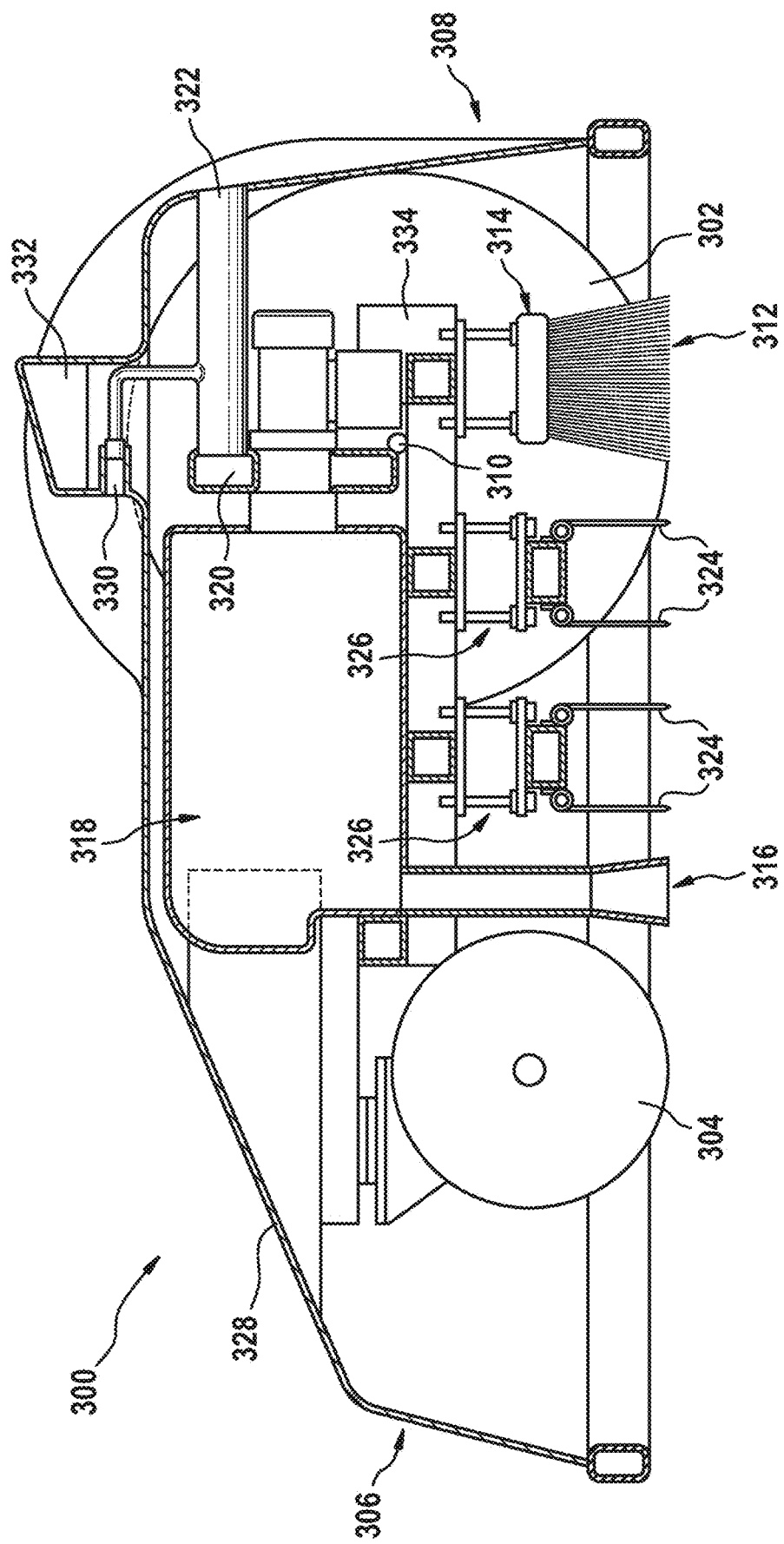
FIG. 3 shows a side view of a turf maintenance robot.
Figure 4:
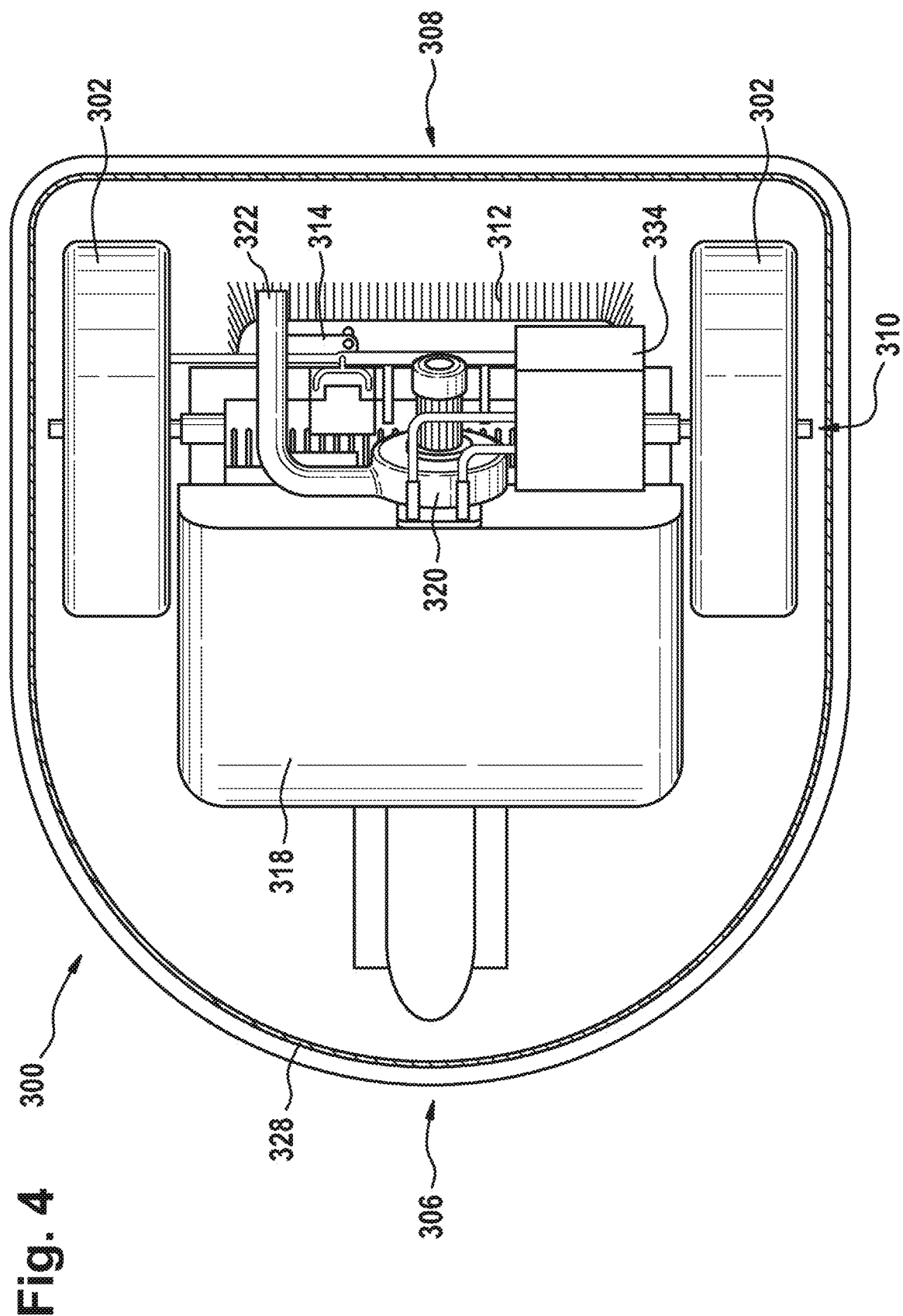
FIG. 4 shows a top view of the turf maintenance robot of FIG. 3.

FIGS. 3 and 4 illustrate an example of a turf maintenance robot 300. FIG. 3 shows a side view and FIG. 4 shows a top view. Both are views of the same robot. The robot 300 is shown as having two drive wheels 302. The drive wheels 302 in this example also comprise a battery or batteries which are integrated into the drive wheels 302. There is also a single front steering wheel 304 that is used to control the direction of travel of the turf maintenance robot 300. The turf maintenance robot has a front 306 and a back or rear 308. The robot 300 is designed such that it travels in the direction of going with the front 306 forward. The drive wheels 302 rotate about a common rotational axis 310. Behind the common rotational axis 310 is located a brush 312. The brush 312 is connected to the turf maintenance robot 300 by a brush height adjustment mechanism 314.

The brush 312 is mostly located closer to the back or rear 308 than the common rotational axis 310. Between the steering wheel 304 and the two drive wheels 302 is located an inlet nozzle 316. The inlet nozzle 316 is an inlet for a vacuum system. The vacuum system is formed by a garbage container 318, a blower 320, and an exhaust 322. The inlet nozzle 316 is used to remove garbage or debris from the artificial turf before it is prepared or brushed using the brush 312. Between the nozzle 316 and the brush 312 are located a number of turf infill ploughing structures 324. The turf infill ploughing structures may also be referred to as rakes. The turf infill ploughing structures 324 are used to break up and loosen the artificial turf infill before it is brushed. The turf infill ploughing structures 324 are connected to the turf maintenance robot 300 by a number of ploughing structure height adjustment mechanisms 326. As the robot 300 travels forward the artificial turf is first vacuumed using the inlet nozzle 316.

The artificial turf infill is then roughly dispersed using a turf infill ploughing structure 324. This loosens and may cause the artificial turf infill to be less densely packed. Then finally the artificial turf infill is smoothed and put into position using the brush 312. The brush 312 also may have the effect of making the artificial turf fibers 106 stand up more straight. The entire robot 300 is shown as being covered with a plastic chassis 328. The turf maintenance robot 300 is also shown as comprising a charging socket 330 and a GPS antenna 332. The GPS antenna 332 may also be replaced by other antennas used for receiving different sorts of radio signals for either data exchange and/or positioning. A controller 334 is additionally visible in FIG. 4.

The example illustrated in FIGS. 3 and 4 is only one example. The example in FIGS. 3 and 4 uses a fixed or stationary brush 312. Other examples may use a rotating brush.

The robot illustrated in FIGS. 3 and 4 may have several advantages. The use of the stationary brush and the batteries may provide for a robot that may move at approximately 4 km per hour and would take about five hours for it to maintain a typical artificial turf in the form of a football or soccer field.

The robot 300 has dimensions of typically about 100 cm wide, 115 cm long and about 54 cm high and would weigh about 100 kg.

The robot in FIG. 3 is shown as optionally comprising a magnetic metal removal component 340. The robot may for example may a permanent magnet or electro magnet that is mounted such that it is able to attract metal fragments that are present in the turf. This may have the benefit of being able to remove ferromagnetic fragments from the turf. In the case of an electromagnet, the electromagnet could be turned off when it is desired to remove and collected metal fragments. If a permanent magnet is used, the permanent magnet could be removable to facilitate removal of any collected metal fragments.

The robot in FIG. 3 is shown as optionally comprising a grass cutting element 342. A rotating blade or other cutting surface may be incorporated into the robot 300 that is able to cut grass plants to a predetermined height or an adjustable height. This may be useful for cutting grass plans (mowing) that are part of a hybrid turf surface or a natural turf surface. The grass cutting element may in some examples also be able to be selectively turned on and off. This may enable, for example, turning the grass cutting element off when the robot is being used on an artificial turf surface. If the robot is then used over a natural turf or a hybrid turf the grass cutting element can be turned on.

The robot in FIG. 3 is shown as optionally comprising a grass watering component 344. The grass watering component may for example incorporate a nozzle that is connected to a reservoir or to a hose. This may enable to grass watering element to spray water onto the surface of the turf. This may be useful for watering natural grass plants that are incorporated into artificial turfs or natural turfs. It may also be useful for wetting the surface of an artificial turf before it is used. The spraying of water may for example be used to help prevent the artificial turf from overheating.

Figure 5:
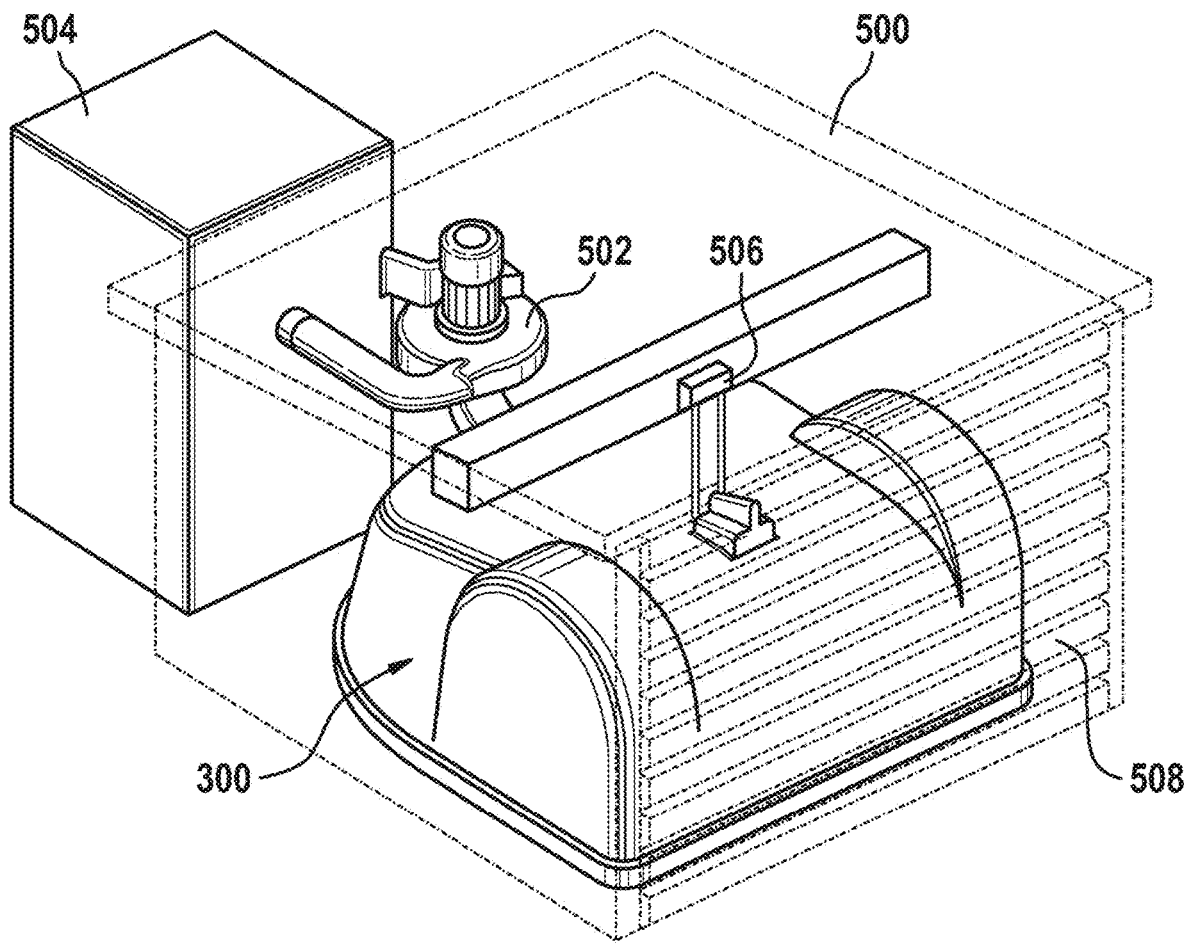
FIG. 5 shows the turf maintenance robot of FIG. 3 in a robot cradle of a robot garage.
Figure 6:
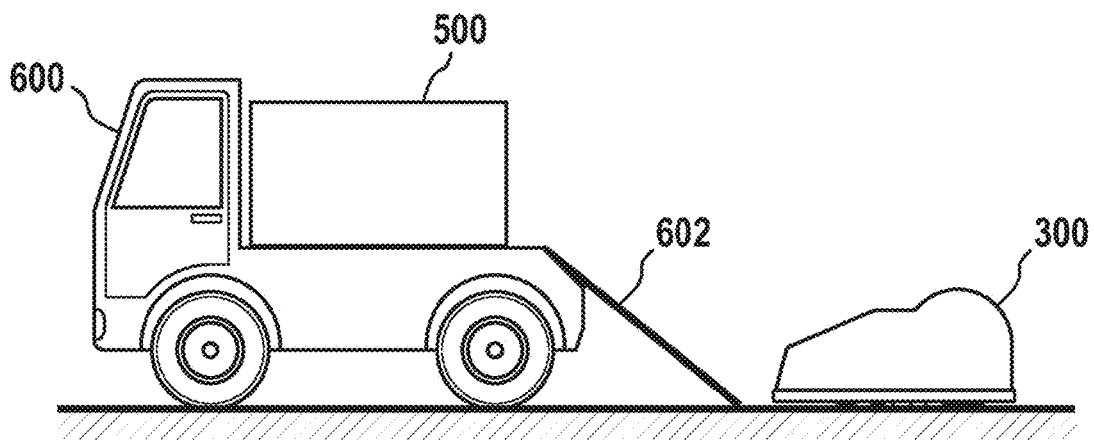
FIG. 6 shows a robot cradle integrated into an autonomous vehicle.

FIG. 5 shows an example of a robot cradle or garage 500. The robot cradle 500 comprises a secondary vacuum 502 for emptying rubbish or garbage from the turf maintenance robot 300. This is deposited in an external garbage container 504. The robot cradle 500 also comprises a charger 506 for automatically charging the turf maintenance robot 300. The robot cradle 500 also has an automatic door 508 which is able to secure or lock the turf maintenance robot 300 securely within the robot cradle 500. This may help prevent damage or theft to the turf maintenance robot 300. It can be seen that the turf maintenance robot 300 must both enter and exit through the automatic door 508. The turf maintenance robot can therefore go either forwards or backwards. The front 306 and back 308 defined in FIG. 3 or 4 is the direction that the turf maintenance robot 300 travels when it is in the process of brushing or cleaning the artificial turf.

The robot cradle 500 may also be located or incorporated into an autonomous vehicle 600. For example the robot cradle 500 could be mounted on the back of a self-driving car or truck. In this example a ramp 602 provides access to the robot cradle 500. The turf maintenance robot 300 is able to drive and enter the autonomous vehicle 600 and be driven from location to location. This may be beneficial because the turf maintenance robot 300 can have its garbage removed and also be charged when it is being brought automatically between different artificial turfs. This may save time and may result in more efficient use of the turf maintenance robot 300.

Figure 7:
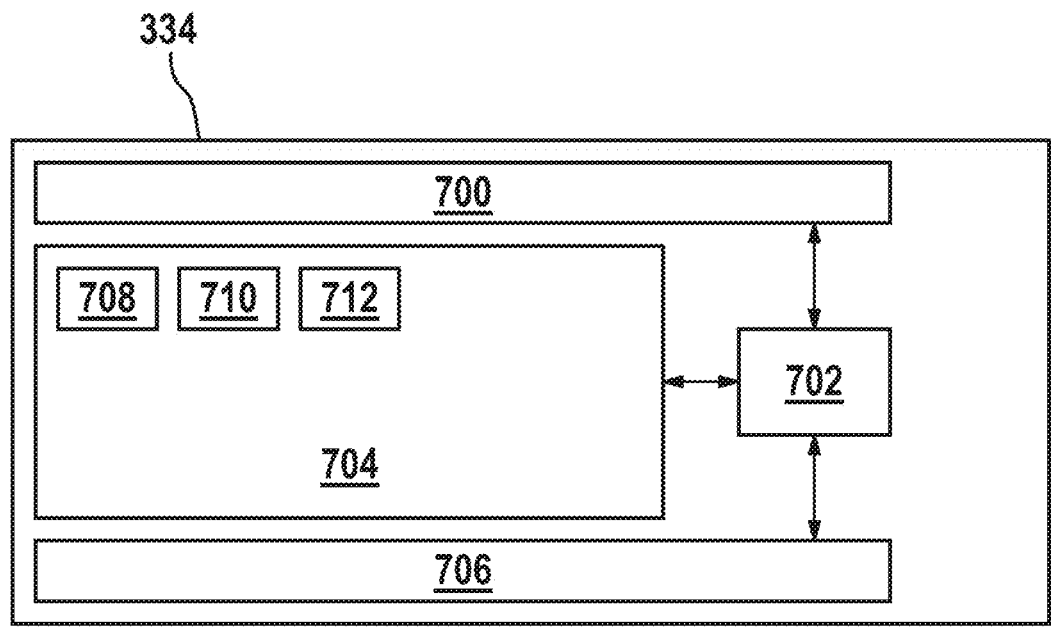
FIG. 7 illustrates an example of a controller.

FIG. 7 shows an example of the controller 334 of the turf maintenance robot 300. The controller 334 comprises a hardware interface connected to a processor 702. The hardware interface 700 enables the processor 702 to control the operation and function of the turf maintenance robot 300. It allows it to control such things as the steering wheel 304, the drive wheels 302 and the blower 320 of the vacuum system. The processor 702 is also shown as being connected to a memory 704 and a positioning system 706. The positioning system 706 may comprise one or more of a triangulation system for cell power data, a GPS receiver, a Galileo receiver, a Glonass receiver, and/or a radio system for determining the location from beacons or markers placed in or around the artificial turf. The positioning system 706 is not present in all examples. The memory 704 is shown as containing machine-executable instructions 708.

Execution of the machine-executable instructions 708 by the processor 702 enables the processor 702 to control and operate the turf maintenance robot 300. The memory 704 is further shown as containing turf grain data 710. The turf grain data 710 contains data which indicates the spatial location of the grain of the artificial turf. The memory 704 is shown as optionally containing a cross brushing path 712. The cross brushing path 712 is a path which the turf maintenance robot 300 will follow such that it directly opposes the grain of the turf. In any case the turf grain data 710 enables the machine-executable instructions 708 to brush the artificial turf surface using the artificial turf maintenance robot 300. The artificial turf maintenance robot performs the brushing dependent upon the turf grain data 710.

Figure 8:
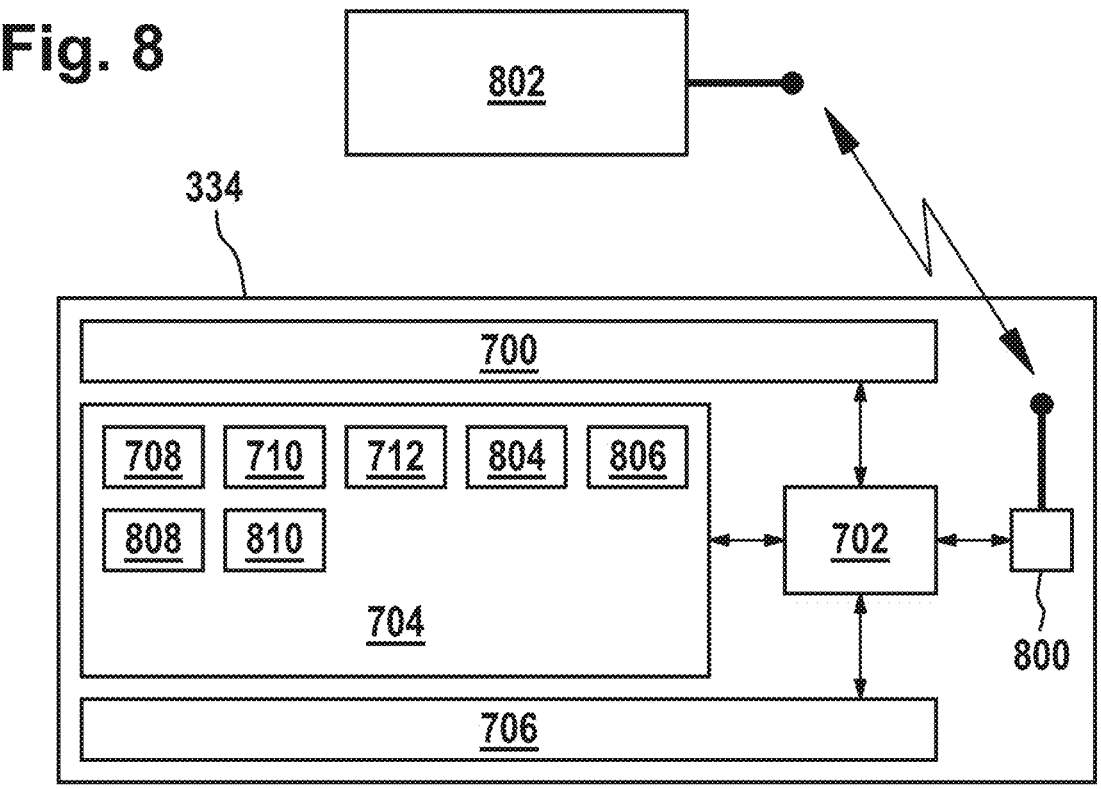
FIG. 8 illustrates a further example of a controller.

FIG. 8 shows a modification of the controller 334 of FIG. 7. In FIG. 8 the controller 334 further comprises a transceiver 800. The transceiver 800 enables the processor 702 to communicate to a remote server 802. The transceiver 800 for example may be a radio transceiver, a cell transceiver, a Wi-Fi system or other system which enables the processor 702 to communicate with a remote server 802. The memory 704 is shown as optionally containing a database query 804. The database query may be used to query a database located in the remote server 802. The turf grain data 710 may be at least partially in response to the database query 804. For example the turf grain data 710 could be sent to the processor 702 which then stores it in the memory 704.

The memory 704 is further shown as containing usage data 806 which may be stored by a usage meter. The usage meter may for example be a hardware component or it may be a program or sub-program which is run by the processor 702. It may for example record the distance and/or time usage of the turf maintenance robot. The usage data 806 may for example be used to generate repair instructions 808 and/or billing data such as an invoice either locally by the processor 702 or alternatively the usage data 806 may be sent to the remote server 802 and the repair instructions 808 and/or the invoice 810 may be generated there.

Figure 9:
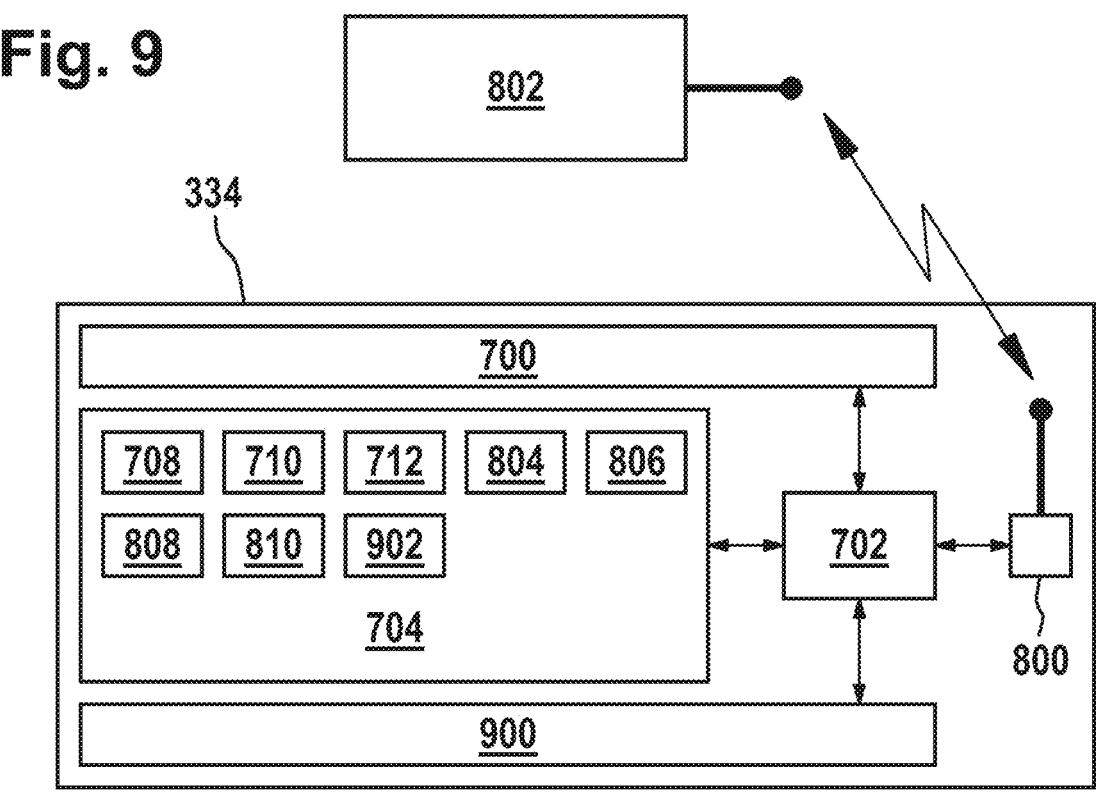
FIG. 9 illustrates a further example of a controller.

FIG. 9 shows a further modification of the controller 334 of FIG. 7 or 8. In this example the controller 334 is further shown as containing an optical sensor 900. The optical sensor may for example be a camera, a stereo camera, or a combination thereof. The processor 702 is able to acquire the optical data by controlling the optical sensor 900. The optical data 902 is shown as being stored in the memory 704. The processor 702 then performs such things as pattern recognition or uses a machine learning algorithm to at least partially determine the turf grain data 710 from the optical data 902. For example the turf grain data may be received and as the turf maintenance robot 300 operates the optical data 902 is used to adjust the turf grain data 710 to the current conditions of the artificial turf.

Figure 10:
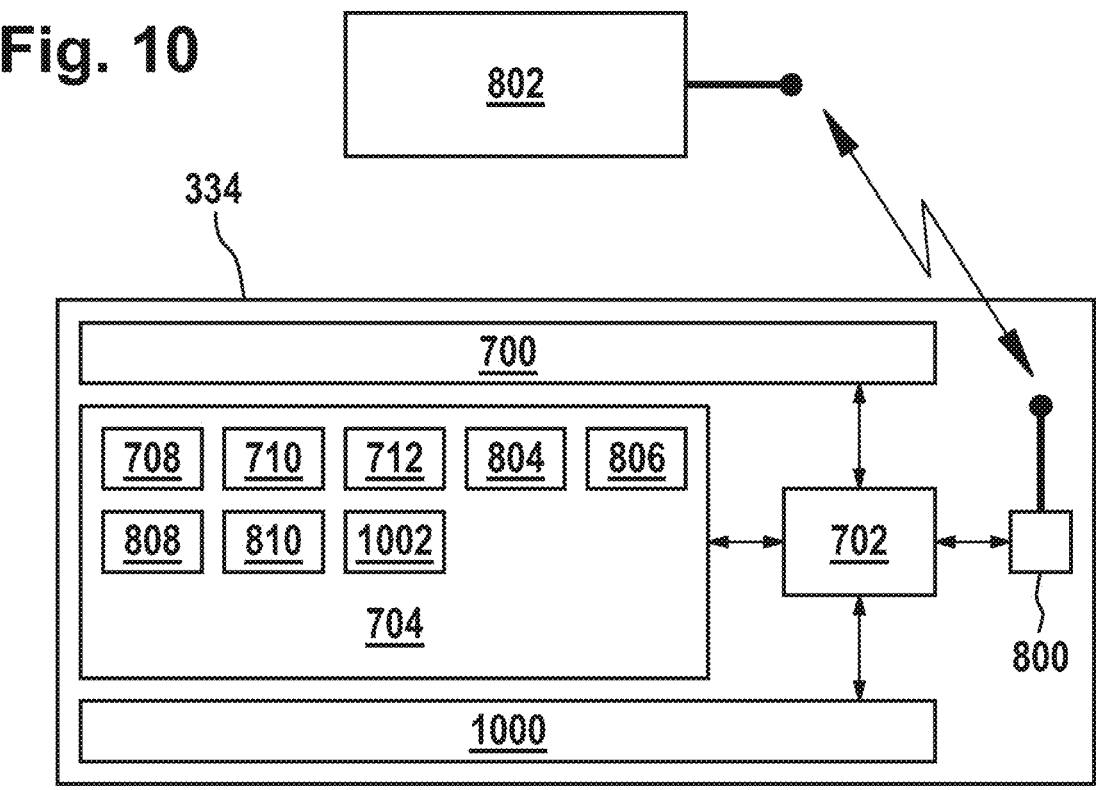
FIG. 10 illustrates a further example of a controller.

FIG. 10 shows a further modification of the controller 334 of FIG. 8. In this example the controller 334 is shown as being connected to an RFID reader 1000. The RFID reader 1000 is able to read data from RFID data carriers within the artificial turf and receive RFID data 1002 which is shown as being stored in the memory 704. The RFID data 1002 may contain location data which may be used to at least partially generate and position the artificial turf robot 300 and it may also contain local turf data which may be used to at least partially determine the turf grain data 710.

Figure 11:
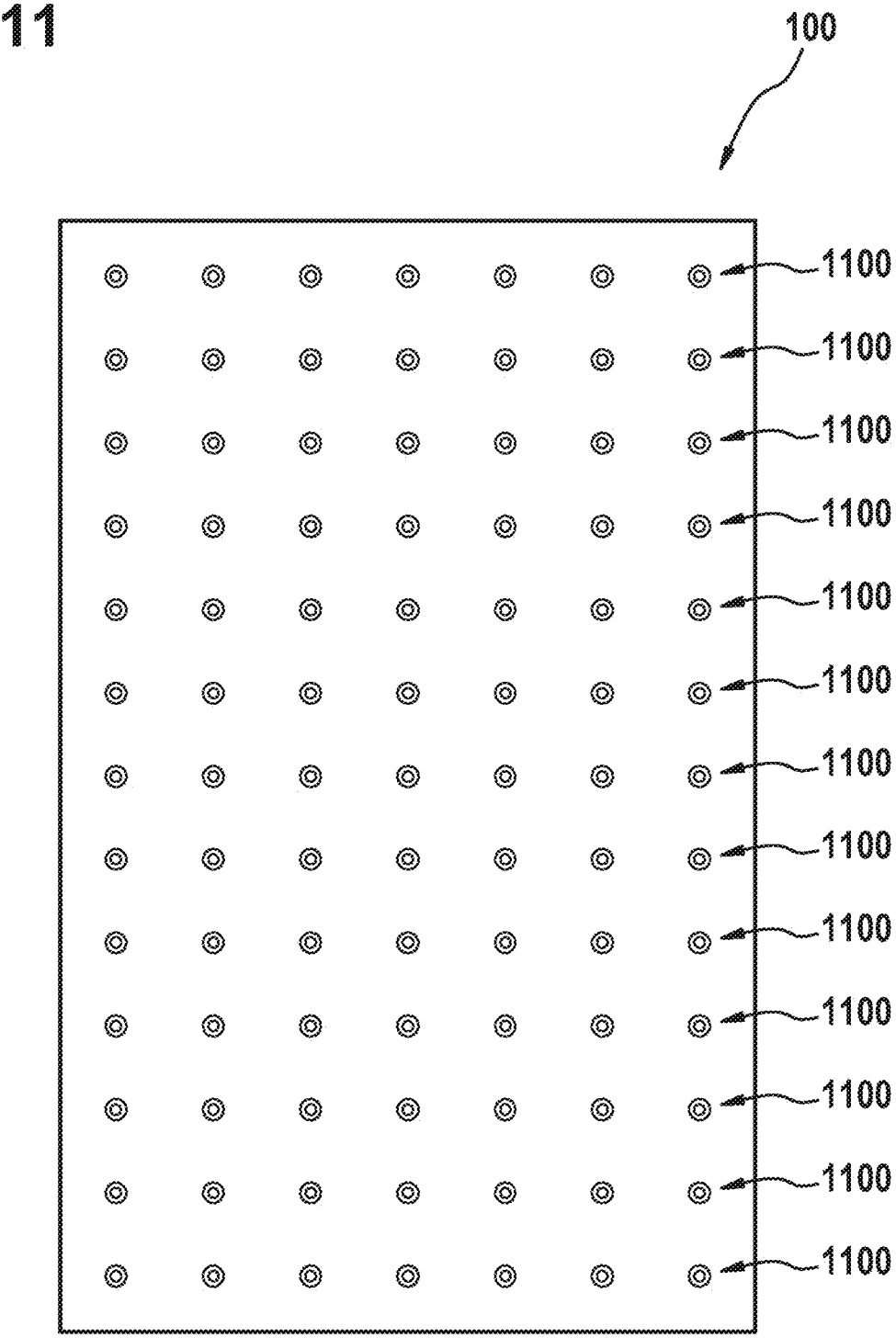
FIG. 11 illustrates a further example of an artificial turf.

FIG. 11 shows the artificial turf 100 of FIG. 2. In FIG. 11 the location of the grain is not shown but instead the location of RFID data carriers 1100 is shown. The RFID data carriers 1100 may for example be embedded in the backing 104 of the artificial turf. The RFID data carriers 1100 may be RFID tags or chips which contain data about the position and/or the turf grain direction in the vicinity of the RFID data carrier 1100. This may be used for positioning the turf maintenance robot and/or orienting it so that it brushes or cleans the artificial turf properly.

Figure 12:
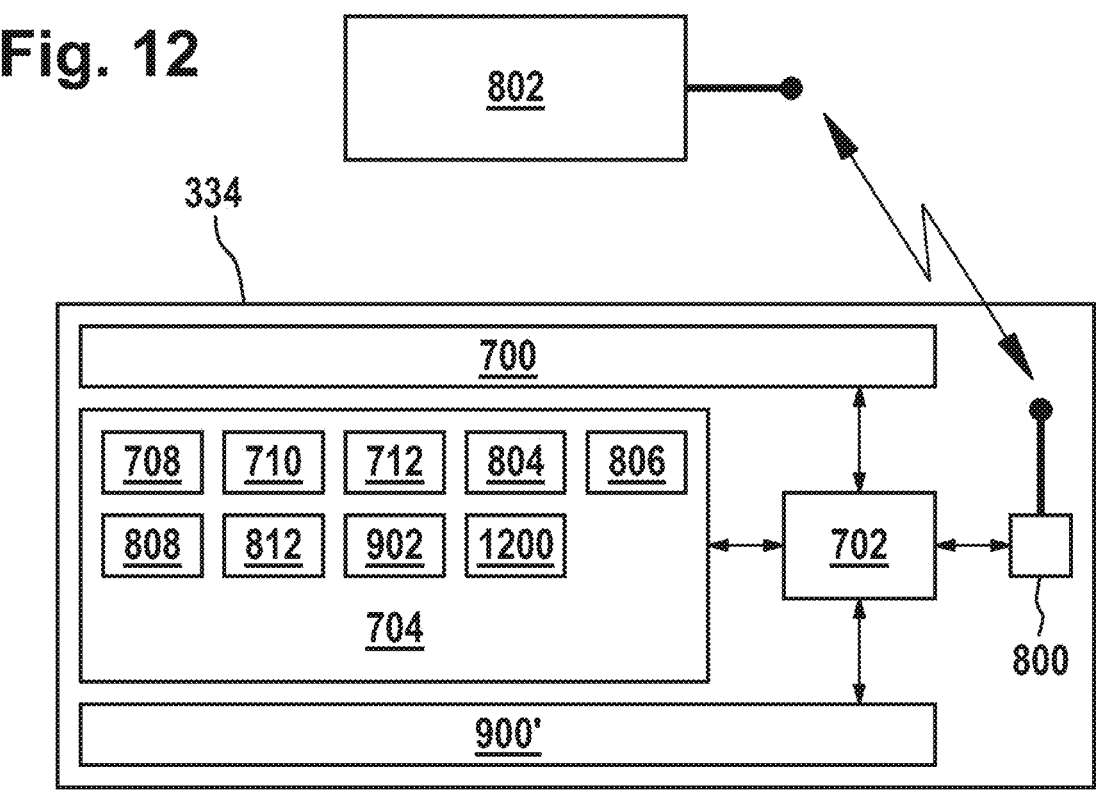
FIG. 12 illustrates a further example of a controller.

FIG. 12 shows a modification of the controller 334 of FIG. 9. In this example the optical sensor 900 has been replaced with an optical sensor 900' that is able to detect fluorescence. For example fluorescent dyes or markers could be used in the artificial turf fibers. The optical data 902 could be used to identify a detected path 1200. In the example in FIG. 12 the detected path 1200 may be an optical path. The detected path 1200 is explained later in the context of FIGS. 14, 15 and 16.

Figure 13:
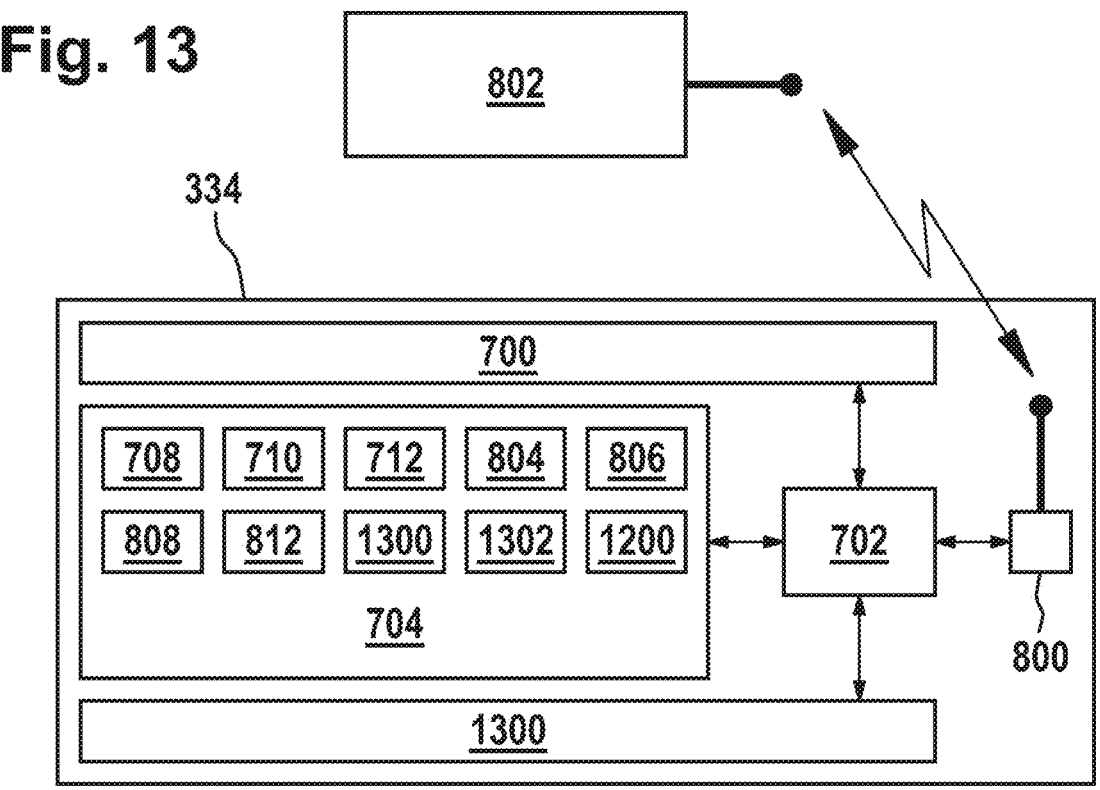
FIG. 13 illustrates a further example of a controller.

FIG. 13 shows a further modification of the controller 334 of FIG. 8. In this example the controller 334 is further shown as being connected to a magnetic sensor 1300 such as a magnetometer. The magnetic sensor 1300 could for example detect magnetic particles that are embedded in regions of the artificial turf fibers and/or backing of the artificial turf carpet. Magnetic particles or materials may also be located between the artificial turf backing and the ground. The magnetic sensor 1300 is able to detect magnetic detector data 1302 and derive a detected path 1200. In the example of FIG. 13 the detected path 1200 is the detected magnetic path. The guidance of the turf maintenance robot using the detected path 1302 is discussed in the context of FIGS. 14, 15 and 16 also.

The features of the controllers of FIGS. 7, 8, 9, 10, 12, and 13 may be freely combined with each other.

Figure 14:
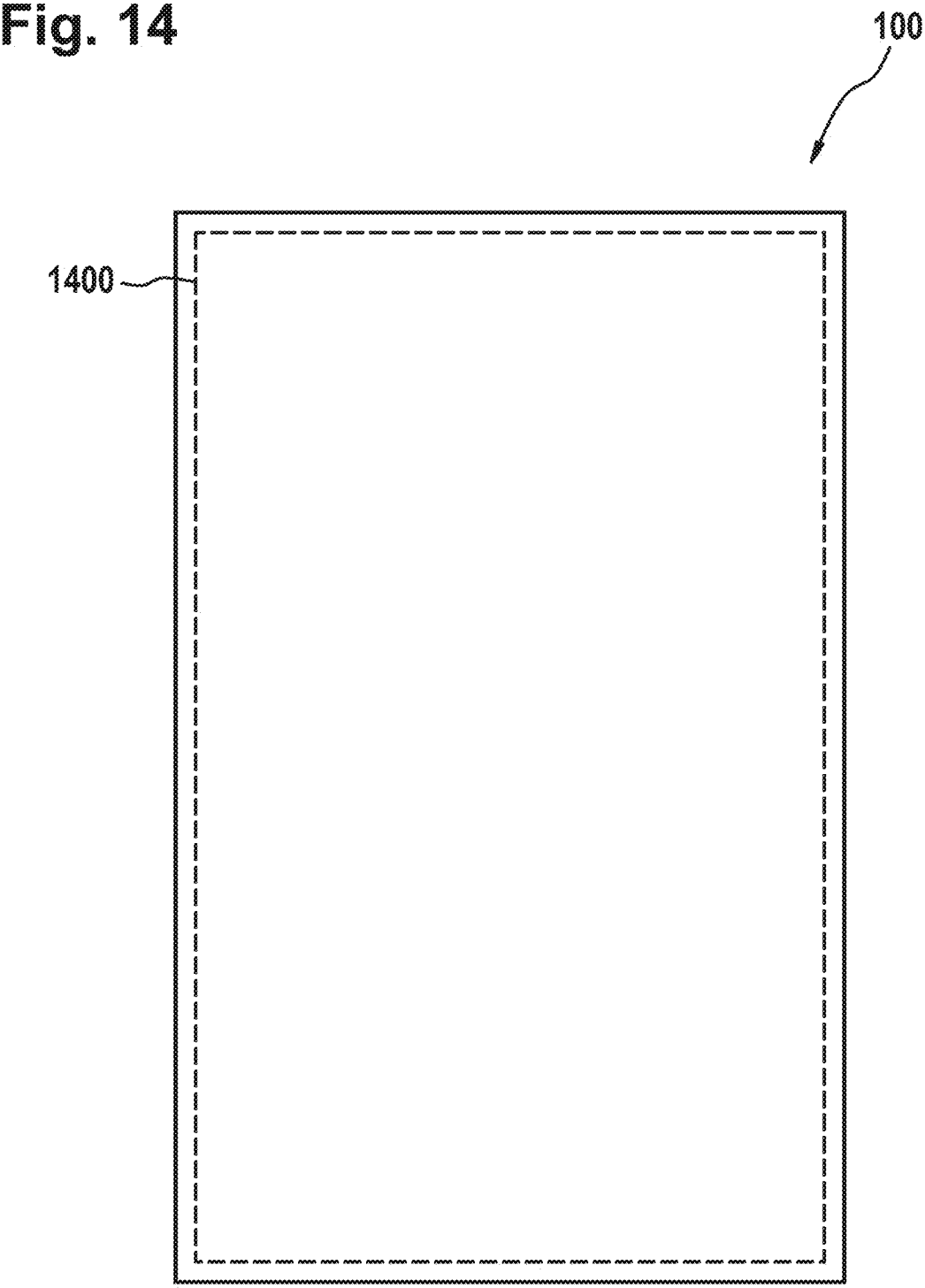
FIG. 14 illustrates a further example of an artificial turf.

FIG. 14 shows a further example of a variant of the artificial turf 100 of FIG. 2. In the example in FIG. 14 there is a boundary path 1400 marked. The boundary path 1400 may for example be indicated with fluorescent materials and/or magnetic particles or materials. This may enable the controller of FIG. 12 or 13 to easily locate the boundary of the artificial turf 100. The location of the boundary 1400 may also enable the turf maintenance robot to better determine its position. This may enable proper brushing of the artificial turf surface by the turf maintenance robot and may also help prevent it from accidentally leaving the artificial turf surface 100.

Figure 15:
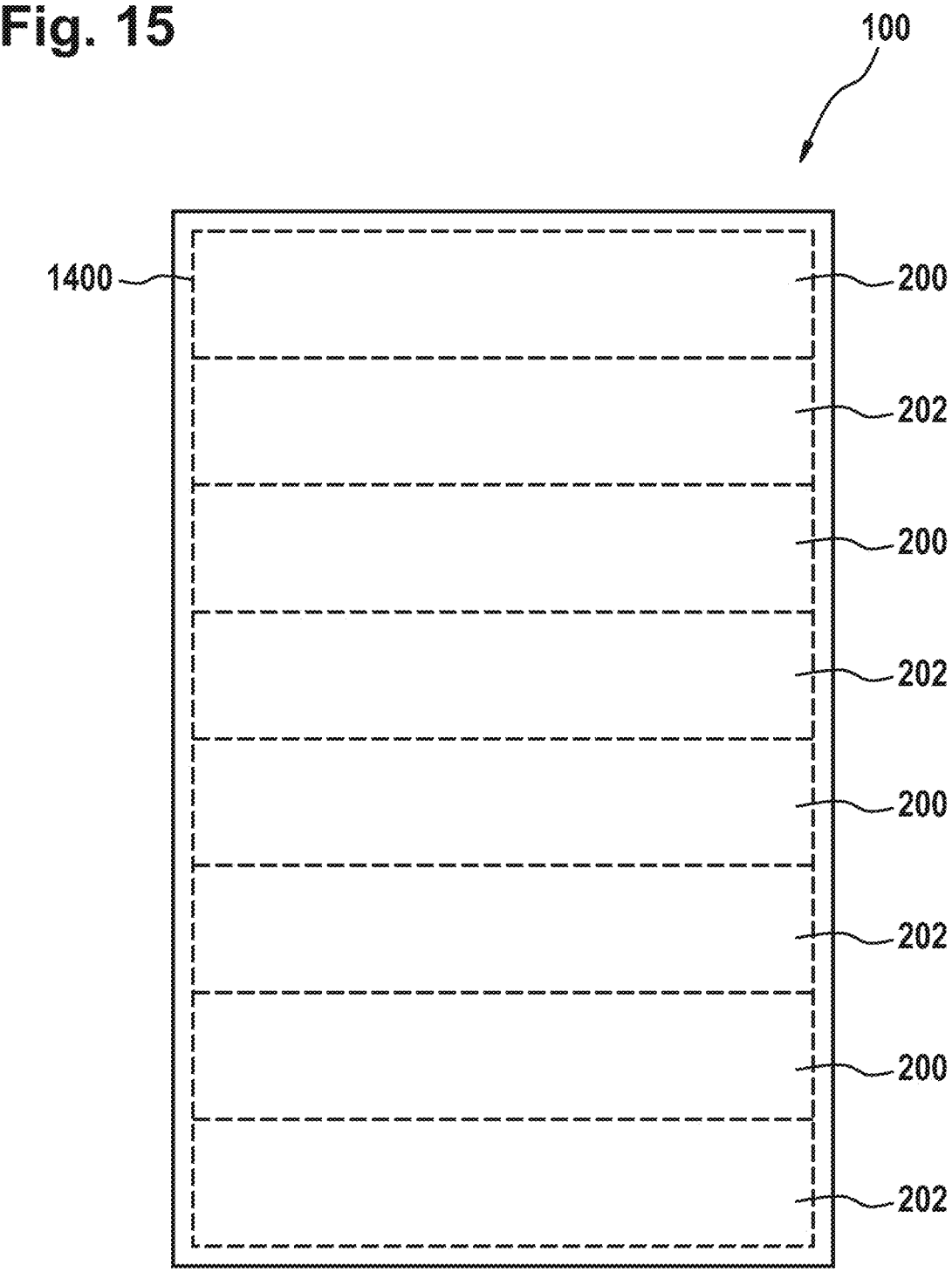
FIG. 15 illustrates a further example of an artificial turf.

FIG. 15 shows a further variant of the artificial turf of FIG. 2. In this example, again there is a boundary path 1400. Instead of bounding the overall artificial turf 100 the boundary path 1400 bounds each of the individual regions 200 and 202 as indicated in FIG. 2. Individual regions with different grains are bounded separately. When the turf maintenance robot crosses a boundary 1400 it then knows that it should adjust its motion to account for the change in the grain of the artificial turf.

Figure 16:
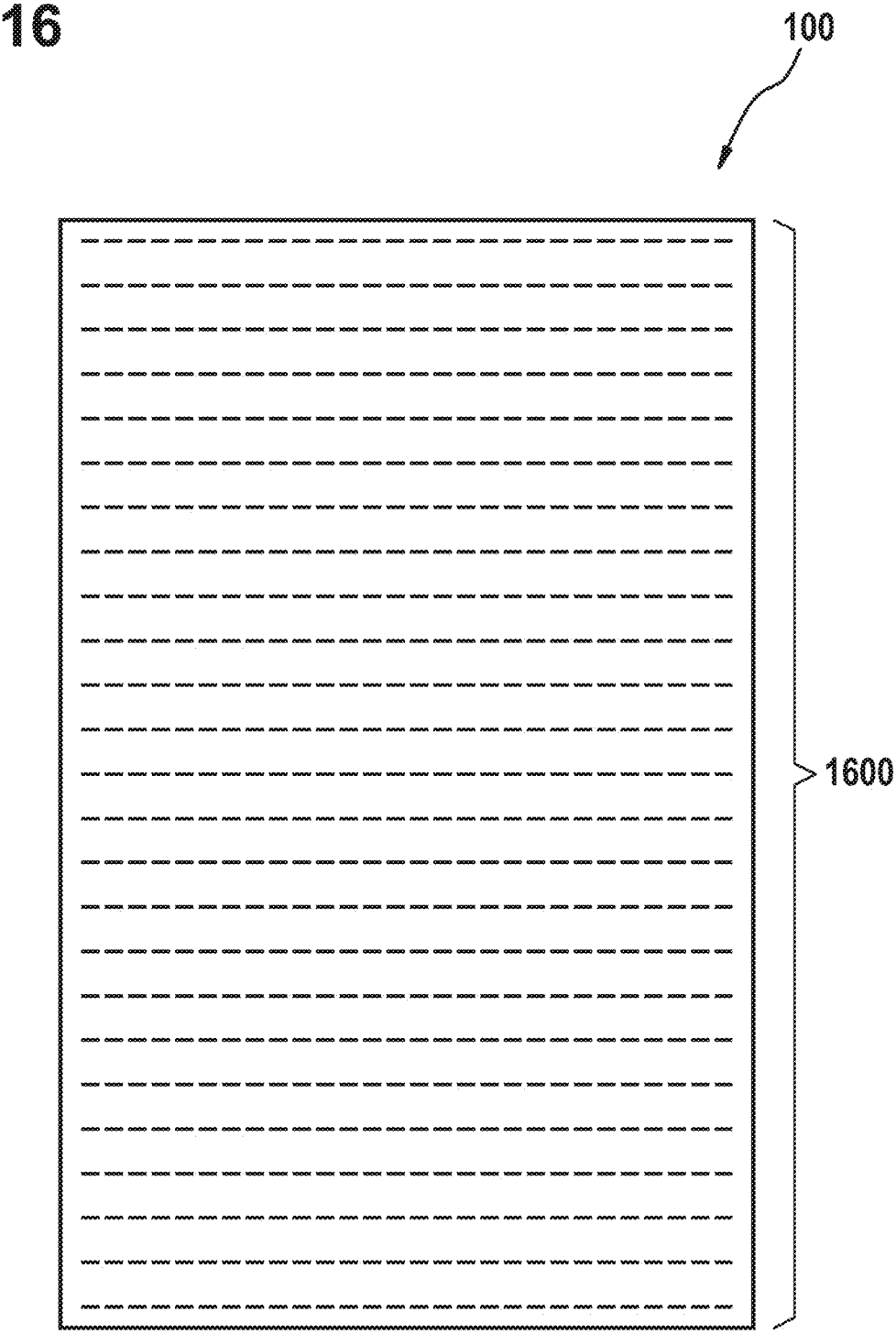
FIG. 16 illustrates a further example of an artificial turf.

FIG. 16 shows a further variant of the artificial turf of FIG. 100. Again, there are a number of predetermined paths 1600. The predetermined paths 1600 may be indicated with fluorescent and/or magnetic particles or materials. In this instance the predetermined paths 1600 are paths which the turf maintenance robot can follow. By following the predetermined paths 1600 in a particular sequence the turf maintenance robot can identify turf grain data which can be used to brush the artificial turf in the proper direction.

Figure 17:
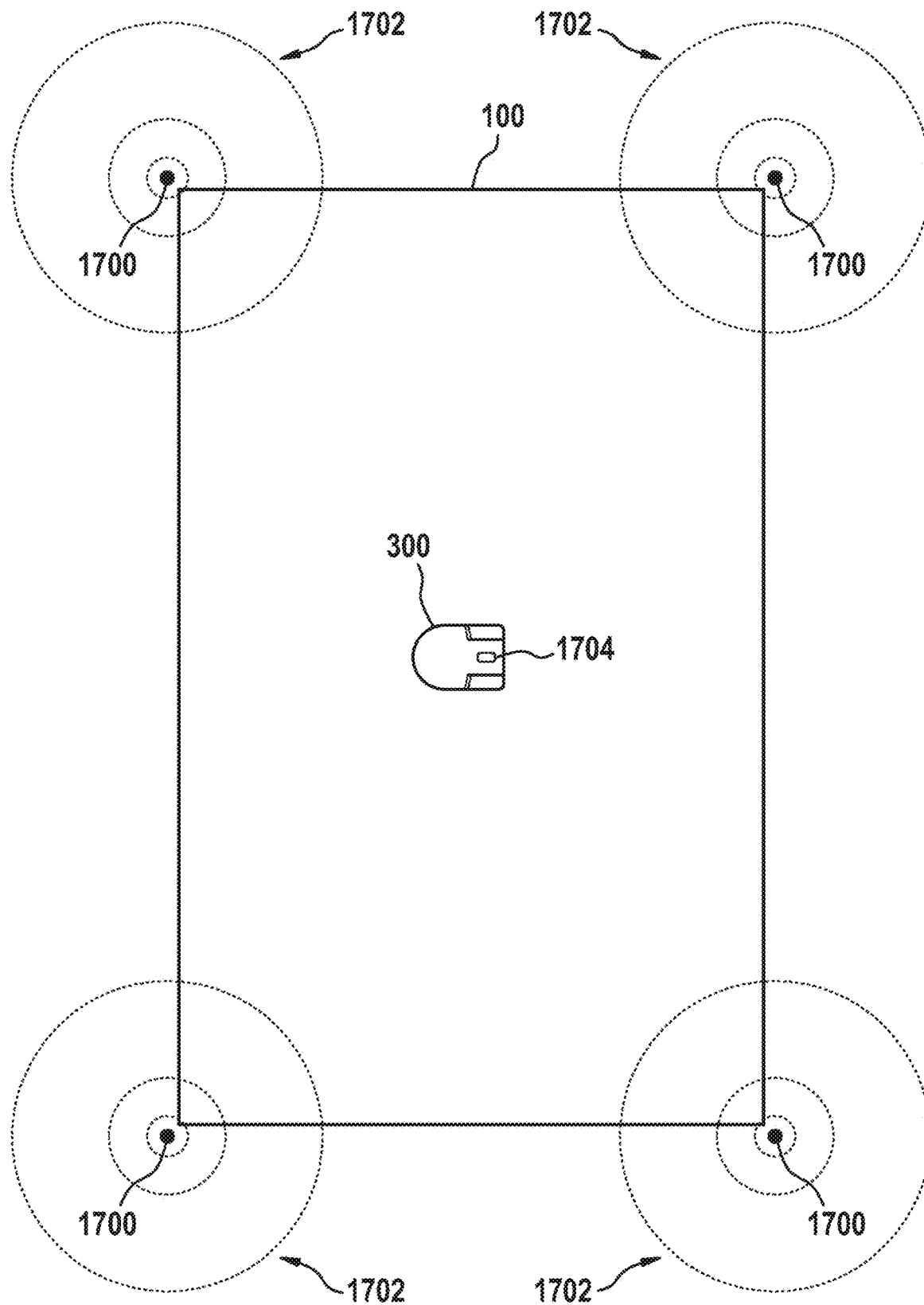
FIG. 17 illustrates a further example of an artificial turf.

FIG. 17 shows a further variant of the artificial turf 100 of FIG. 100. In this example, the artificial turf 100 is rectangular. There is a transmitter 1700 at each corner of the artificial turf 100. These transmitters 1700 emit electromagnetic radiation in the form of a radio signal 1702. The radio signal 1702 may be either an analog or digital signal. A turf maintenance robot 300 is on the artificial turf 100. The turf maintenance robot 300 comprises a receiver 1704 uses the radio signals 1702 to determine its location on the artificial turf 100. The transmitters 1700 enable the receiver to function as a positioning system. In some examples the receiver 1704 is part of the transceiver 800 of FIG. 8. The system depicted in FIG. 17 may for example be a UWB positioning system.

Figure 18:
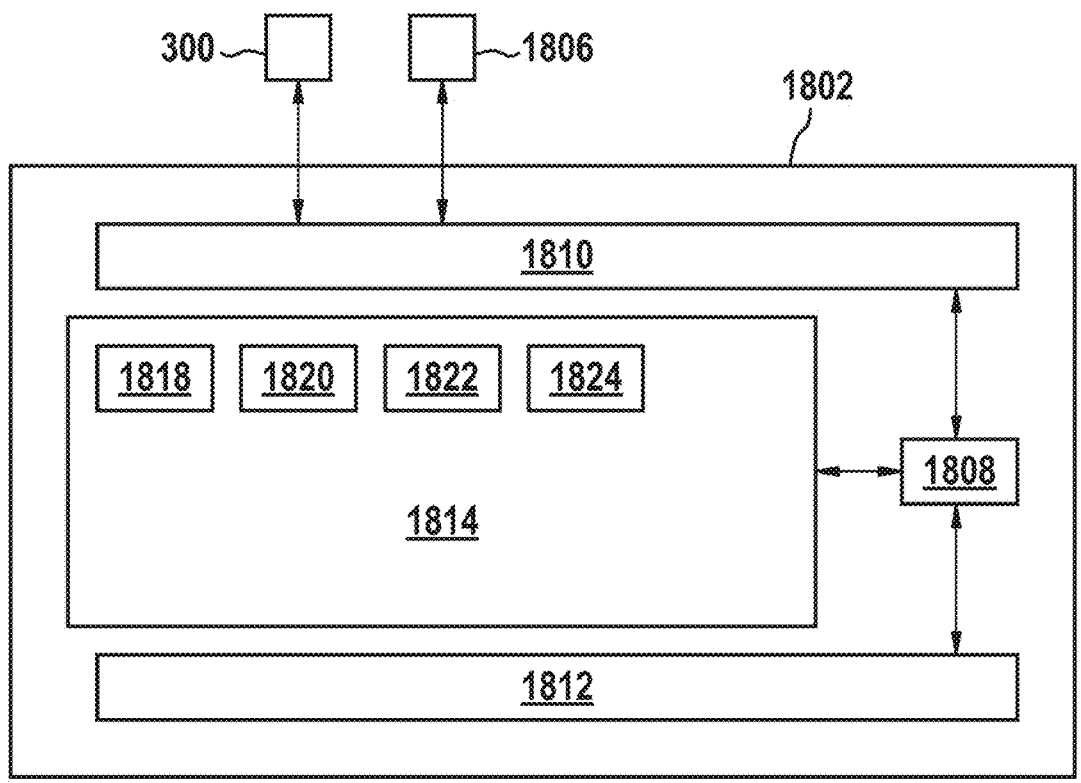
FIG. 18 illustrates an example of a turf maintenance system.

FIG. 18 illustrates an example of a turf maintenance system 1800. In this example the turf maintenance system comprises a computer 1802, a turf maintenance robot 300, and a drone 1806. The computer system 1802 comprises a processor 1808 that is in communication with a hardware interface 1810, a user interface 1812, and a memory 1814.

It should be noted that the components and software elements present in the computer 1802 could also be distributed between the turf maintenance robot 300 and the drone 1806. The features of the computer 1802 can be freely combined with the features of computer 334.

The hardware interface 1810 enables communication between the processor 1808 and the turf maintenance robot 300 and the drone 1806. It may for example be a radio communication system or a Wi-Fi system. The user interface 1812 is optional and may provide an operator to control the operation and function of the turf maintenance system 1800.

The memory 1814 is shown as containing machine-executable instructions 1818 which provide instructions for the processor 1808 which enable it to control the turf maintenance system 1800. The memory 1814 is further shown as containing artificial turf data 1820 that has been acquired by the drone 1806. The memory 1814 is further shown as containing an optional image classification module 1822. The artificial turf data 1820 may for example comprise image data. The image classification module 1822 may take this image data as input. The memory 1814 is further shown as containing the optional location of one or more maintenance zones 1824. The location of the maintenance zone 1824 is the identification of areas that require maintenance by the turf maintenance robot 300. The artificial turf data 1820 or the location of the maintenance zones 1824 may be used for controlling the turf maintenance robot 1804 to perform maintenance on an artificial turf.

Figure 19:
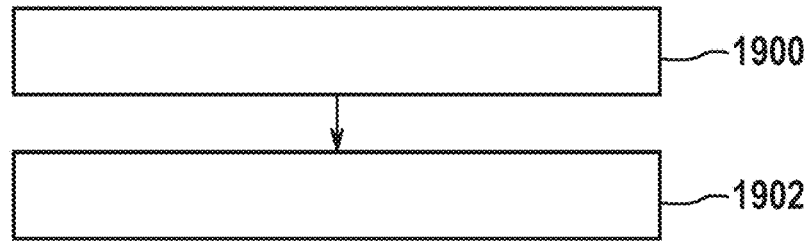
FIG. 19 shows a flow chart which illustrates an example of a method of operating the turf maintenance system of FIG. 18.

FIG. 19 shows a flowchart which illustrates a method of operating the turf maintenance system 1800. First in step 1900 the processor 1808 controls the drone 1806 to fly over the artificial turf and acquire the artificial turf data 1820. Next in step 1902 the processor 1808 controls the turf maintenance robot 1804 to perform maintenance on the artificial turf using the artificial turf data 1820. In some examples the controlling of the artificial turf maintenance robot with the artificial turf data may comprise inputting image data that is part of the artificial turf data into the image classification module 1822 and receiving the location of the maintenance zone 1824 as output.

Figure 20:
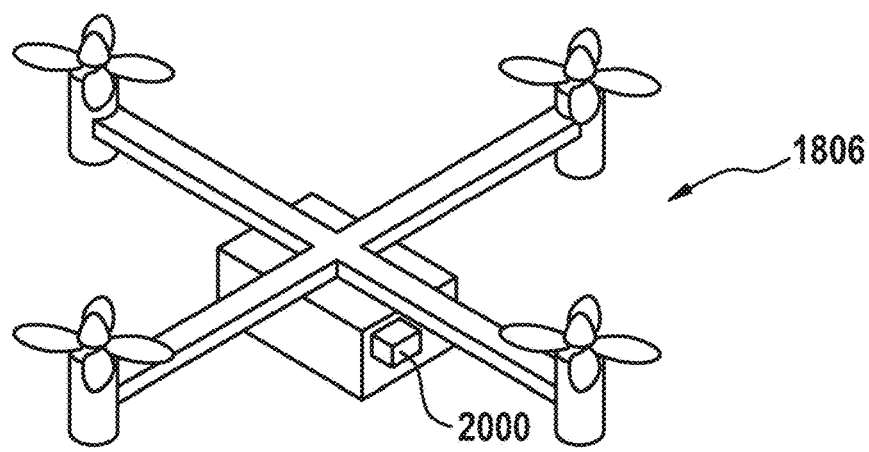
FIG. 20 illustrates an example of a drone.

FIG. 20 illustrates an example of a drone 1806. The drone comprises a sensor 2000. The sensor 2000 is configured for acquiring the artificial turf data as the drone 1806 overflies the artificial turf.

Figure 21:
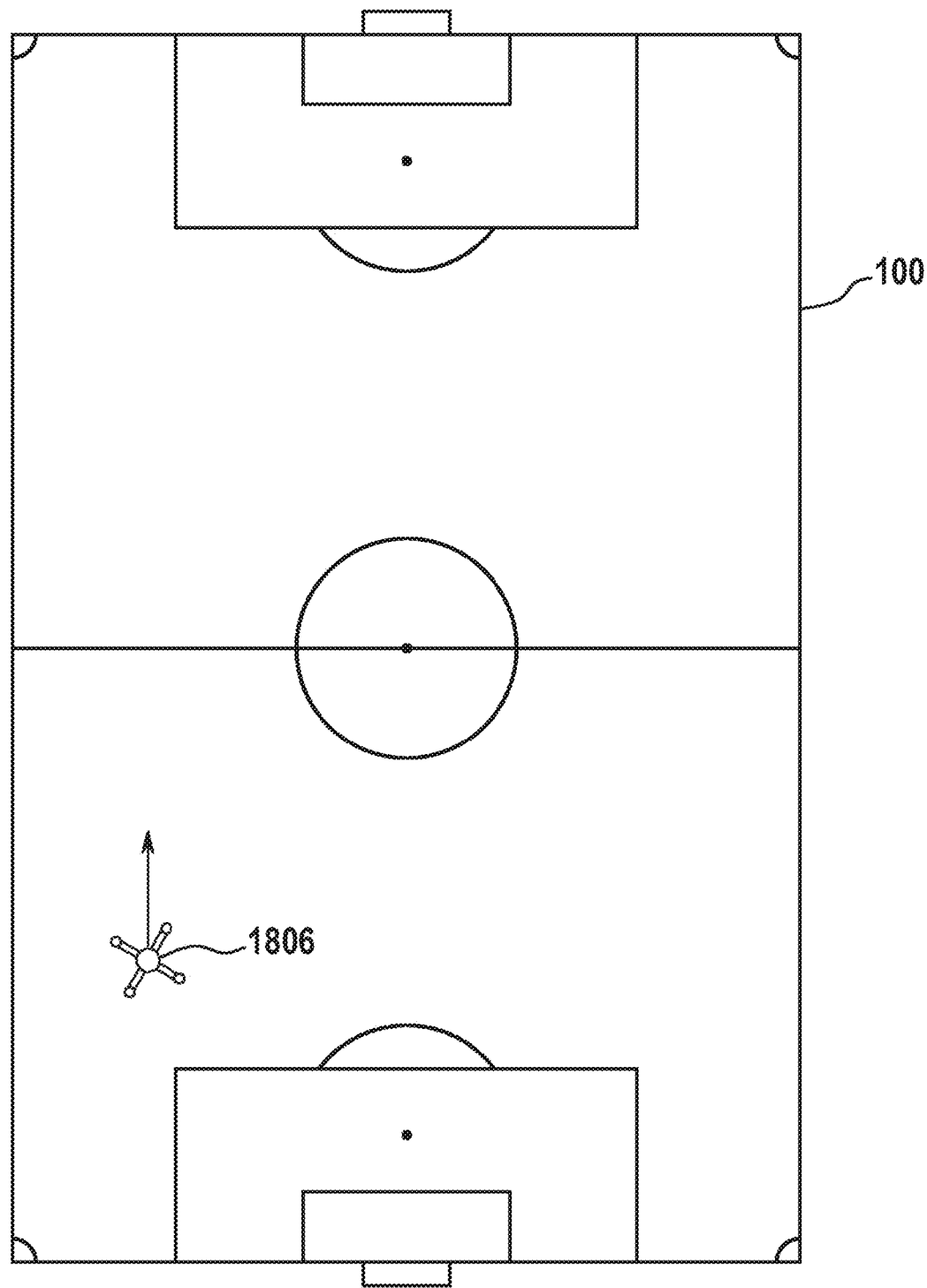
FIG. 21 illustrates an example of a drone surveying an artificial turf.
Figure 22:
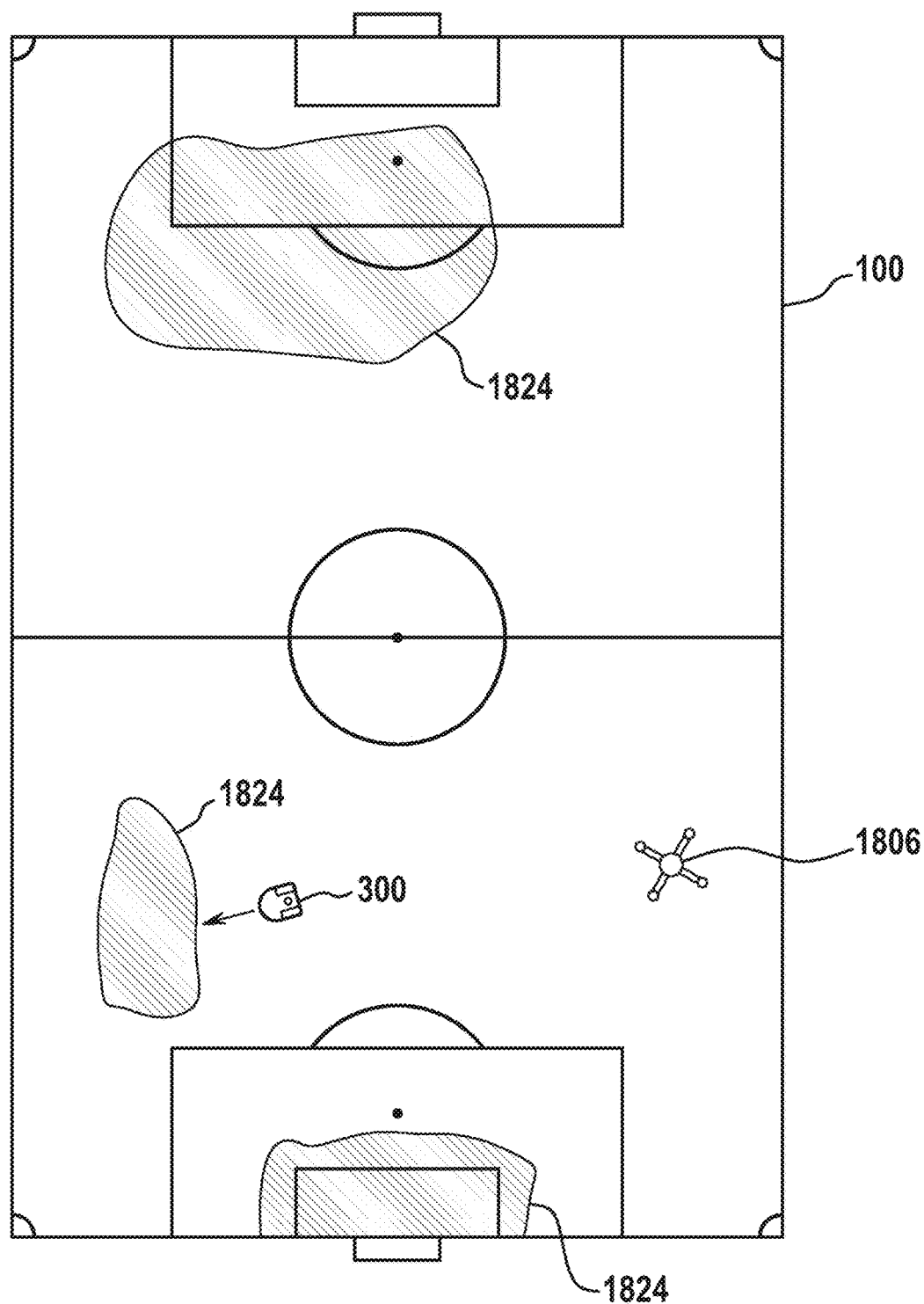
FIG. 22 illustrates the drone of FIG. 21 directing a turf maintenance robot to perform maintenance on the artificial turf.

FIG. 21 shows an artificial turf 100. In this example the artificial turf is a soccer or football field. The artificial turf 100 could be fields for other sports also. The drone 1806 is shown as flying over the artificial turf 100 and is acquiring the artificial turf data 1820.

FIG. 7 shows an additional view of the artificial turf 100 after the drone 1806 has flown over and acquired the artificial turf data 1820. In this example the artificial turf data 1820 comprised image data and the image data was input into the image classification module 1822. The image classification module 1822 then output a number of maintenance zones 1824. The location of these maintenance zones 1824 is shown as being superimposed on the artificial turf 100. The location of these turf maintenance zones 1824 is then used to control the turf maintenance robot 300 to perform maintenance in the turf maintenance zones 1824. In this example there are only several areas and the turf maintenance robot 300 does not need to perform maintenance on the entire artificial turf 100.

The drone 1806 is shown as hovering and monitoring the turf maintenance robot 300. The drone 1806 could for example be used to control directly the turf maintenance robot 300 and ensure it goes to the maintenance zones 1824. This may for example be useful in an indoor arena where it is not possible to receive a GPS signal. The use of the drone 1806 in this fashion would eliminate the need to provide an additional positioning system for the turf maintenance robot 300. In other examples there may be an external positioning system available to the turf maintenance robot 300 such as a GPS system or other location system. In this case the drone 1806 may simply provide the location of the turf maintenance zones 1824 and then the turf maintenance robot 300 performs maintenance on these zones independent of the drone 1806.

Various examples may possibly be described by one or more of the following features specified in the following numbered clauses:

1. A feature comprising a method of maintaining artificial turf (100) using a turf maintenance robot (300), wherein the artificial turf comprises an artificial turf carpet (102), wherein the artificial turf carpet comprises turf fibers (106) which form an artificial turf surface (107), wherein the artificial turf fibers have a grain (114), wherein the artificial turf comprises artificial turf infill (108) distributed between the artificial turf fibers, wherein the turf maintenance robot is a self driving robot, wherein the turf maintenance robot comprises a memory (704) for storing turf grain data (710) descriptive of the grain of the artificial turf fibers, the method comprising brushing the artificial turf surface by the turf maintenance robot, whereby the turf maintenance robot performs the brushing dependent upon the turf grain data.

2. The method of clause 1, wherein the turf maintenance robot comprises a positioning system (706) for determining a trajectory of the turf maintenance robot.

3. The method of clause 2, wherein the position system is further configured for providing a current location, wherein the turf grain data is spatially dependent, wherein the brushing of the artificial turf surface is at least partially determined by turf grain data and the current location.

4. The method of clause 1, wherein the turf maintenance robot comprises a positioning system (706) for determining a current location, wherein the brushing of the artificial turf surface is at least partially determined by the current location.

5. The method of clause 4, wherein the positioning system further comprises a receiver (1704), and wherein the receiver is configured for at least partially determining the current location using multiple received radio signals (1702).

6. The method of any one of the preceding clauses, wherein the turf maintenance robot further comprises a transceiver (800), wherein the method further comprises receiving at least a portion of the turf grain data via the transceiver, and wherein the method further comprises storing the turf grain data in the memory.

7. The method of clause 6, wherein the method further comprises sending a database query (804) via the transceiver, wherein the turf grain data is received via the transceiver in response to the database query.

8. The method of any one of the preceding clauses, wherein the turf maintenance robot comprises at least one optical sensor (900) configured for acquiring optical data (902) descriptive of the artificial turf surface within a field of view of the at least one optical sensor, wherein the method further comprises:
   acquiring the optical data using the at least one optical sensor; and
   using the controller to at least partially determining the turf grain data using the optical data.

9. The method of clause 8, wherein the at least one optical sensor comprises any one of the following: a camera, a stereo camera, and combinations thereof.

10. The method of clause 9, wherein the controller is configured to use a machine learning algorithm to at least partially determine the turf grain data using the optical data.

11. The method of any one of the preceding clauses, wherein the turf maintenance robot comprises a usage meter for recording usage data (806), wherein the usage data comprises any one of the following: a time usage data, distance traveled usage data, and combinations thereof, wherein the method further comprises recording the usage data using the usage meter.

12. The method of clause 11, wherein the method further comprises generating an invoice using the usage data.

13. The method of clause 11, wherein the method further comprises:
   sending the usage data to a remote server (802) or cloud storage device;
   generating a billing invoice using the usage data by the remote server or the cloud storage device.

14. The method of clause 11, 12, or 13, wherein the method further comprises generating repair instructions using at least partially the usage data.

15. The method of any one of the preceding clauses, wherein the turf maintenance robot further comprises at least two drive wheels (302) configured for propelling the self propelled robot, wherein the at least two drive wheels have a common rotational axis (310), wherein a brush (312) is mounted at least partially behind the rotational axis, and wherein the brush is mounted between the two drive wheels.

16. The method of any one of the preceding clauses, wherein the turf maintenance robot comprises a vacuum system configured for vacuuming the artificial turf surface, wherein the method further comprises vacuuming the artificial turf surface during the brushing of the artificial turf surface.

17. The method of clause 16, wherein the vacuum system comprises an inlet nozzle (316) is configured for contacting the artificial turf surface in front of the brush.

18. The method of any one of the preceding clause, wherein the turf maintenance robot further comprises turf infill plowing structures (324) in front of the brush.

19. The method of clause 18, wherein the turf infill plowing structures comprise a plowing structure height adjustment mechanism (326).

20. The method of any one of the preceding clauses, wherein the turf maintenance robot comprises a brush height adjustment mechanism (314) for adjusting the brush height.

21. The method of any one of the preceding clauses, wherein the brushing of the artificial turf surface comprises:

calculating a cross brushing path (712) using at least partially the turf grain data; and controlling the turf maintenance robot to follow the cross brushing path.

22. The method of any one of the preceding clauses, wherein method further comprises controlling the turf maintenance robot to travel between multiple artificial turf surfaces.

23. The method of any one of the preceding clauses, wherein the turf maintenance robot further comprises at least one RFID reader (1000), wherein the method further comprises at least partially determining the turf grain data using the at least one RFID reader.

24. The method of clause 23, wherein the artificial turf comprises an artificial turf carpet with a backing (104), wherein the backing comprises RFID data carriers (1100), wherein the RFID data carriers contain local turf data, wherein the local turf data at least partially comprises the turf grain data, wherein the controller is configured for at least partially receiving the turf grain data from the RFID data carriers by reading the local turf data from the RFID data carriers with the at least one RFID reader.

25. The method of any one of the preceding clauses, wherein artificial turf fibers comprise an optical path (1200) marked with fluorescent dye markers, wherein the self propelled robot comprises at least one optical sensor (900') configured for acquiring optical data descriptive of the artificial turf surface within a field of view of the at least one optical sensor, wherein the controller is configured for detecting the optical path marked with fluorescent dye markers within the optical data, wherein the method further comprises at least partially determining the turf grain data using the optical path.

26. The method of any one of the preceding clauses, wherein artificial turf fibers comprise a magnetic path (1200) marked with magnetic markers, wherein the self propelled robot comprises a magnetic sensor (1300) configured for determining the magnetic path marked with the magnetic markers, wherein the method further comprises at least partially determining the turf grain data using the magnetic path.

27. The method of any one of the preceding clauses, wherein the method further comprises automatically moving the turf maintenance robot between different artificial turf surfaces using an autonomous vehicle.

28. The method clause 27, wherein the method further comprises moving the turf maintenance robot using an autonomous vehicle, wherein the autonomous vehicle comprise a robot cradle (500) for holding the turf maintenance robot during travel, and wherein the robot cradle is further configured for charging the turf maintenance robot.

29. A feature comprising a turf maintenance robot (300) configured for brushing an artificial turf surface, wherein the turf maintenance robot is a self driving robot, wherein the turf maintenance robot comprises:

a processor (702) for controlling the turf maintenance robot; and a memory (704) for storing turf grain data (710) descriptive the grain of the artificial turf fibers, wherein the memory further contains machine executable instructions (708) for execution by the processor, wherein execution of the machine executable instructions causes the processor to control the turf maintenance robot to brush the artificial turf fibers dependent upon the turf grain data.

30. The turf maintenance robot of clause 29, wherein the turf maintenance robot further comprises at least two drive wheels (302) configured for propelling the self propelled robot, wherein the at least two drive wheels have a common rotational axis (310), wherein a brush (312) is mounted at least partially behind the rotational axis, and wherein the brush is mounted between the two drive wheels.

31. The turf maintenance robot of clause 30, wherein the turf maintenance robot comprises a vacuum system configured for vacuuming the artificial turf surface, wherein the method further comprises vacuuming the artificial turf surface during the brushing of the artificial turf surface.

32. The turf maintenance robot of clause 31, wherein the vacuum system comprises an inlet nozzle (316) is configured for contacting the artificial turf surface in front of the brush.

33. The turf maintenance robot of any one of clauses 29 to 32, wherein the turf maintenance robot further comprises turf infill plowing structures (324) in front of the brush.

34. The turf maintenance robot of clause 33, wherein the turf infill plowing structures comprise a plowing structure height adjustment mechanism (326).

35. The turf maintenance robot of any one of clauses 29 to 34, wherein the turf maintenance robot comprises a brush height adjustment mechanism (314) for adjusting the brush height.

36. The turf maintenance robot of any one of clauses 29 to 35, wherein execution of the machine executable instructions further cause the processor to:

calculate a cross brushing path (712) using at least partially the turf grain data; and control the turf maintenance robot to follow the cross brushing path.

37. A feature comprising a turf maintenance robot (300) configured for brushing an artificial turf surface, wherein the turf maintenance robot is a self driving robot, wherein the turf maintenance robot comprises:

two drive wheels (302) configured for propelling the self propelled robot, wherein the at least two drive wheels have a common rotational axis (310); and a stationary brush (312) is mounted at least partially behind the rotational axis, and wherein the stationary brush is mounted between the two drive wheels.

38. The turf maintenance robot of clause 37, wherein the turf maintenance robot further comprises:

a processor (702) for controlling the turf maintenance robot; and a memory (704) for storing turf grain data (710) descriptive the grain of the artificial turf fibers, wherein the memory further contains machine executable instructions (708) for execution by the processor, wherein execution of the machine executable instructions causes the processor to control the turf maintenance robot to brush the artificial turf fibers dependent upon the turf grain data.

39. The turf maintenance robot of clause 38, wherein the turf maintenance robot comprises a vacuum system configured for vacuuming the artificial turf surface, wherein the method further comprises vacuuming the artificial turf surface during the brushing of the artificial turf surface, wherein the vacuum system comprises an inlet nozzle is configured for contacting the artificial turf surface in front of the brush 40. The turf maintenance robot of any one of clauses 29 to 39, wherein the turf maintenance robot further comprises a grass cutting element (342).

41. The turf maintenance robot of any one of clauses 29 to 40, wherein the turf maintenance robot further comprises a grass watering component (344).

42. The turf maintenance robot of any one of clauses 29 to 41, wherein the turf maintenance robot further comprises a magnetic metal removal component (340).

43. The turf maintenance robot of any one of clauses 29 to 42, wherein the turf maintenance robot comprises a positioning system (706) for providing a current location to the processor (702), wherein the processor is configured for self driving the turf maintenance robot at least partially using the current location.

44. A feature comprising a turf maintenance robot (300) configured for brushing an artificial turf surface, wherein the turf maintenance robot is a self driving robot, wherein the turf maintenance robot comprises:
  a wireless network interface configured for connecting to a cloud server;
  a processor (702) for controlling the turf maintenance robot; and
  a memory containing machine executable instructions (708) for execution by the processor, wherein execution of the machine executable instructions causes the processor to:
    connect to the cloud server;
    receive turf maintenance data from the cloud server; and
    control the turf maintenance robot to brush the artificial turf fibers at least partially using the turf maintenance data.

LIST OF REFERENCE NUMERALS 100 artificial turf
102 artificial turf carpet
104 backing
106 artificial turf fibers
107 artificial turf surface
108 artificial turf infill
110 ground
112 average direction of artificial turf fibers
114 grain direction
116 cross brushing direction
200 first direction of grain
202 second direction of grain
300 turf maintenance robot
302 drive wheel
304 steering wheel
306 front
308 back or rear
310 common rotational axis
312 brush
314 brush height adjustment mechanism
316 inlet nozzle
318 garbage container
320 blower
322 exhaust
324 turf infill plowing structure
326 plowing structure height adjustment mechanism
328 plastic chassis
330 charging socket
332 GPS antenna
334 controller
340 magnetic metal removal component
342 grass cutting element
344 grass watering component
500 robot cradle or garage
502 secondary vacuum
504 garbage container
506 charger
508 automatic door
600 autonomous vehicle
602 ramp
700 hardware interface
702 processor
704 memory
706 positioning system
708 machine executable instructions
710 turf grain data
712 cross brushing path
800 transceiver
802 remote server
804 database query
806 usage data
808 repair instructions
810 invoice
900 optical sensor
900' optical sensor
902 optical data
1000 RFID reader
1002 RFID data
1100 RFID data carrier
1200 detected path
1300 magnetic sensor
1302 magnetic detector data
1400 boundary path
1600 predetermined path
1700 transmitter
1702 radio signal
1704 receiver
1800 turf maintenance system
1802 computer
1806 drone
1808 processor
1810 hardware interface
1812 user interface
1814 memory
1818 machine executable instructions
1820 artificial turf data
1822 image classification module
1824 location of maintenance zone
1900 control the drone to fly over the artificial turf and acquire the artificial turf data
1902 control the turf maintenance robot to perform maintenance on the artificial turf using the artificial turf data
2000 sensor

The invention claimed is:

1. A method of maintaining artificial turf, wherein the artificial turf comprises an artificial turf carpet, wherein the artificial turf carpet comprises turf fibers which form an artificial turf surface, wherein the artificial turf fibers have a grain, wherein the artificial turf comprises artificial turf infill distributed between the artificial turf fibers, the method comprising:
  brushing the artificial turf surface, wherein the brushing is dependent upon turf grain data, and wherein the turf grain data is descriptive of the grain of the artificial turf fibers, wherein
    brushing the artificial turf surface further comprises brushing the artificial turf surface with a turf maintenance robot, wherein the turf maintenance robot comprises a controller, wherein the turf maintenance robot comprises at least one optical sensor configured for acquiring optical data from the artificial turf fibers descriptive of the artificial turf surface within a field of view of the at least one optical sensor, and wherein the method further comprises:

acquiring the optical data using the at least one optical sensor; and at least partially determining, by the controller, the turf grain data using the acquired optical data.

2. The method of claim 1, wherein the method further comprises:

controlling a drone to fly over the artificial turf and acquire artificial turf data descriptive of the artificial turf, wherein the drone comprises a sensor configured for acquiring the artificial turf data; and controlling the turf maintenance robot to perform maintenance on the artificial turf using the artificial turf data.

3. The method of claim 2, wherein the artificial turf data comprises image data; wherein the method further comprises:

identifying at least one maintenance zone within the artificial turf by inputting the image data into an image classification module; and controlling the turf maintenance robot to perform maintenance on the at least one maintenance zone.

4. The method of claim 3, wherein the image classification module is configured for identifying the at least one maintenance zone using any one of the following:

detecting a color difference in the turf images;

detecting a spatially dependent reflectivity of the artificial turf;

detecting a pile direction pattern in the turf images; and combinations thereof.

5. The method of claim 2, wherein performing maintenance on the artificial turf comprises any one of the following:

cleaning a surface of the artificial turf;

the brushing of the artificial turf;

redistributing artificial turf infill; and combinations thereof.

6. The method of claim 1, wherein the turf maintenance robot comprises a positioning system for determining a current location, the method further comprising:

determining the current location, wherein the brushing of the artificial turf surface with the turf maintenance robot further is based at least partially upon the determined current location.

7. The method of claim 1, wherein the turf maintenance robot is a self-driving robot, wherein the turf maintenance robot comprises a memory for storing the turf grain data, wherein the turf maintenance robot comprises a usage meter for recording usage data, wherein the usage data comprises any one of the following: a time usage data, distance traveled usage data, and combinations thereof, and wherein the method further comprises:

recording the usage data by the usage meter; and generating repair instructions using at least partially the usage data.

8. The method of claim 7, wherein the method further comprises generating an invoice using the usage data.

9. The method of claim 1, wherein the turf maintenance robot is a self-driving robot, wherein the brushing of the artificial turf surface comprises:

calculating a cross brushing path using at least partially the turf grain data; and controlling the turf maintenance robot to follow the cross brushing path.

10. The method of claim 1, wherein the turf maintenance robot is a self-driving robot, wherein the method further comprises controlling the turf maintenance robot to travel between multiple artificial turf surfaces.

11. The method of claim 1, wherein the turf maintenance robot further comprises at least one RFID reader, wherein the method further comprises at least partially determining the turf grain data using the at least one RFID reader.

12. The method of claim 11, further comprising:

reading local turf data from RFID data carriers with the at least one RFID reader, wherein the artificial turf carpet includes a backing, wherein the backing comprises the RFID data carriers, wherein the RFID data carriers contain the local turf data, wherein the local turf data at least partially comprises the turf grain data; and at least partially receiving, by-a the controller, the turf grain data from the at least one RFID reader.

13. The method of claim 1, wherein the turf maintenance robot is a self-driving robot, wherein the artificial turf fibers comprise an optical path marked with fluorescent dye markers, and wherein the controller is configured for detecting the optical path marked with fluorescent dye markers within the optical data, wherein the method further comprises:

at least partially determining the turf grain data using the optical path, including:

acquiring optical data descriptive of the artificial turf surface within a field of view of the at least one optical sensor, and detecting the optical path marked with fluorescent dye markers within the optical data.

14. The method of claim 1, wherein the turf maintenance robot is a self-driving robot, wherein the artificial turf fibers comprise a magnetic path marked with magnetic markers, wherein the self-driving robot comprises a magnetic sensor configured for determining the magnetic path marked with the magnetic markers, wherein the method further comprises:

determining the magnetic path marked with the magnetic markers, and at least partially determining the turf grain data using the magnetic path.

15. The method of claim 6, wherein the brushing of the artificial turf surface with the turf maintenance robot is further based at least partially upon the determined current location and the turf grain data, wherein the turf grain data is spatially dependent.

16. The method of claim 13, wherein the fluorescent dye markers mark boundaries between regions of artificial turf fibers having different grains.

17. The method of claim 13, wherein the fluorescent dye markers are combined into particular artificial turf fibers.

18. The method of claim 9, wherein the artificial turf carpet has a pile, and wherein the method further comprises:

indicating, from the optical data, that the pile that has been trampled down and requires a cross brushing.

* * * * *